(12) United States Patent
Shibata et al.

(10) Patent No.: US 7,369,258 B2
(45) Date of Patent: May 6, 2008

(54) NETWORK COMMUNICATION DEVICE

(75) Inventors: Tetsuya Shibata, Yawata (JP); Takeshi Nakamura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 1014 days.

(21) Appl. No.: 10/438,495

(22) Filed: May 14, 2003

(65) Prior Publication Data

US 2003/0214678 A1 Nov. 20, 2003

(30) Foreign Application Priority Data

May 17, 2002 (JP) ............................. 2002-143712

(51) Int. Cl.
- G06F 15/00 (2006.01)
- H04N 1/00 (2006.01)
- H04B 1/00 (2006.01)

(52) U.S. Cl. ................. 358/1.15; 358/402; 379/100.01
(58) Field of Classification Search ............... 358/1.15, 358/1.1, 402, 442, 444, 405, 406, 412, 468; 379/100.01

See application file for complete search history.

(56) References Cited

U.S. PATENT DOCUMENTS

| | | | | |
|---|---|---|---|---|
| 5,282,238 A * | 1/1994 | Berland | ...................... | 455/557 |
| 5,293,250 A * | 3/1994 | Okumura et al. | ........... | 358/402 |
| 5,351,134 A * | 9/1994 | Yaguchi et al. | ............. | 358/435 |
| 6,313,926 B1 * | 11/2001 | Kumagai et al. | ........... | 358/442 |
| 6,407,828 B1 * | 6/2002 | Medina | ...................... | 358/462 |
| 6,640,238 B1 * | 10/2003 | Bowman-Amuah | ......... | 709/201 |
| 6,650,440 B1 * | 11/2003 | Wing | ......................... | 358/402 |
| 6,785,014 B1 * | 8/2004 | Nishikawa | .................. | 358/1.15 |
| 6,785,017 B1 * | 8/2004 | Yoshiura | .................... | 358/1.15 |
| 6,965,446 B2 * | 11/2005 | Wakabayashi | ............. | 358/1.15 |
| 6,989,907 B1 * | 1/2006 | Jeyachandran et al. | .... | 358/1.15 |
| 7,020,697 B1 * | 3/2006 | Goodman et al. | .......... | 709/223 |
| 7,092,129 B2 * | 8/2006 | Oobayashi | .................. | 358/402 |
| 7,102,772 B1 * | 9/2006 | Lapstun et al. | ............ | 358/1.15 |
| 7,120,122 B1 * | 10/2006 | Starr et al. | ................... | 370/250 |
| 7,161,313 B2 * | 1/2007 | Piepgras et al. | ............ | 315/318 |
| 7,199,906 B1 * | 4/2007 | Tamura | ...................... | 358/400 |
| 2002/0075521 A1 * | 6/2002 | Oobayashi | .................. | 358/402 |
| 2002/0129361 A1 * | 9/2002 | Arita et al. | ................... | 725/23 |
| 2002/0140960 A1 * | 10/2002 | Ishikawa | ................... | 358/1.13 |
| 2002/0149800 A1 * | 10/2002 | Medina | ................. | 358/426.02 |
| 2003/0038981 A1 * | 2/2003 | Trachtman | .................. | 358/407 |
| 2003/0058277 A1 * | 3/2003 | Bowman-Amuah | ......... | 345/765 |
| 2004/0174559 A1 * | 9/2004 | Mori | ......................... | 358/1.15 |

FOREIGN PATENT DOCUMENTS

| | | |
|---|---|---|
| JP | 06-121002 | 4/1994 |
| JP | 09-018545 | 1/1997 |
| JP | 10-079753 | 3/1998 |
| JP | 2001-274944 | 10/2001 |
| JP | 2001-309109 | 11/2001 |

* cited by examiner

Primary Examiner—Madeleine A V Nguyen
(74) Attorney, Agent, or Firm—David C. Conlin; Steven M. Jensen; Edwards Angell Palmer & Dodge LLP

(57) ABSTRACT

A network communication device measures an elapsed time from the transmission of facsimile data prepared by an e-mail message composing section to the reception of a delivery verification response by a clock section. In accordance with the measurement, a time managing section changes a waiting time by which an occurrence of a timeout error is determined to, for example, a mean value or a maximum value. This sets the waiting time to an optimal value suitable to a network environment, for example.

15 Claims, 17 Drawing Sheets

FIG. 15

| SHORT NUMBER | RECIPIENT'S NAME | E-MAIL ADDRESS | FILE FORMAT | COMPRESSION SCHEME | VERIFY DELIVERY? | DELIVERY VERIFICATION REFERNCE TIME (INCREMENTAL BY 30 MIN.) | WAITIGN TIME FOR DELIVERY VERIFICATION (1 TO 240 MIN.) | ADJSUTMENT TIME α (1 TO 60 MIN.) | RETRANSMISSIONS IN CASE OF TIME-OUT ERROR (1 TO 15 TIMES) |
|---|---|---|---|---|---|---|---|---|---|
| 001 | **** | 11@**** | PDF | MH | YES | 30 | — | — | 2 |
| 002 | **** | 22@**** | PDF | MMR | YES | — | 50 | 15 | 2 |
| 003 | **** | 33@**** | TIFF | MH | YES | — | 40 | 10 | 0 |
| 004 | **** | 44@**** | TIFF | MH | NO | — | — | — | — |
| 005 | **** | 55@**** | PDF | MH | YES | 60 | — | 10 | 2 |
| 006 | **** | 66@**** | PDF | MH | YES | 120 | — | 10 | 2 |
| . | . | . | . | . | . | . | . | . | . |
| . | . | . | . | . | . | . | . | . | . |
| . | . | . | . | . | . | . | . | . | . |

NETWORK COMMUNICATION DEVICE

FIELD OF THE INVENTION

The present invention relates to a network communication device which transmits/receives e-mail messages over a network.

BACKGROUND OF THE INVENTION

Recent development of networking has created new applications for network communication devices which transmit/receive e-mail messages over the Internet or like network.

Some newly developed network communication devices can not only capture an image with a built-in scanner function, but also forward the captured image information to a computer or like apparatus connected to the network in the form of an attachment file of an e-mail message. Network facsimile machines have been developed too which incorporate a built-in print function and telephone function in addition to the scanner function.

Such a network facsimile machine is disclosed in, for example, Japanese Published Unexamined Patent Application 2001-274944 (Tokukai 2001-274944, published on Oct. 5, 2001). FIG. 17 is a schematic showing an arrangement of the machine. In that network facsimile machine, an e-mail message sent from a transmitting-end terminal 1 to a transmitting-end mail server machine 2 is transferred to a receiving-end mail server machine 4 via a network 3 using an SMTP (Simple Mail Transfer Protocol) or another predetermined mail transfer protocol. The e-mail message is then stored in the receiving-end mail server machine 4. A receiving-end terminal 5 periodically accesses the receiving-end mail server machine 4 using POP3 (Post Office Protocol 3) or another mail receiving protocol to retrieve the stored e-mail message.

Further, the network facsimile machine is adapted to delete the e-mail message received by the mail server machine 4 so that the e-mail message is not repeatedly transferred after the e-mail message is received and its attached image information is printed out as a received document.

A problem occurs under these circumstances where information is transmitted using an e-mail message as in the foregoing: unlike, for example, those cases when information is transmitted by a normal facsimile machine, the transmitting end has no means to determine whether the information is received normally or processed properly by the receiving end. Specifically, unlike normal facsimile machines performing real time communication with each other over a PSTN (Public Switched Telephone Network), since the receiving-end terminal 5 of the network facsimile machine is not always connected to the mail server machine 4, and the transmitting-end terminal 1 can forward a message to the mail server machine 2 anytime no matter whether the receiving-end terminal 5 can receive it at that time, the receiving-end terminal 5 may take time to actually receive a message, and the transmitting end cannot judge at the time of transmission whether the message is receive normally or processed properly as mentioned in the foregoing.

Therefore, conventionally, when there is a need to confirm safe delivery of the information transmitted from the network facsimile machine, the operator must inconveniently confirm by a telephone call. It is also a problem that e-mail communication loses one of its advantages over telephone communication that the parties involved do not need to talk in real time.

Accordingly, a conventional method technique addressing these shortcomings is defined by the MDN (Message Disposition Notification) method in RFC 2298 which provides a means of confirming safe delivery of an e-mail message whereby upon reception of an e-mail message, the receiving-end terminal sends a confirmation message back to the transmitting-end terminal.

"RFCs" (Requests For Comments) are official documents issued by IETF (Internet Engineering Task Force), an Internet-related technology standards organization. The documents define, for example, specifications and requirements of Internet protocols, such as IP (Internet Protocol), TCP (Transmission Control Protocol), HTTP (HyperText Transfer Protocol), and FTP (File Transfer Protocol), and various Internet-related technologies. They are numbered throughout like "RFC 2298" and publicly available.

Japanese Published Unexamined Patent Application 2001-309109 (Tokukai 2001-309109, published on Nov. 2, 2001) discloses an arrangement of a machine equipped with the MDN function where if an MDN request is sent without receiving a return message by e-mail from the receiving end within a certain period of time after the completion of the transmission, a delivery failure notice is printed out to notify the operator that no return message is sent back. The operator can thereby confirm whether the message has been normally transmitted to the receiving-end terminal.

To realize the MDN function, it is determined, with a preset waiting time as a reference, if the delivery failure notice is to be output according to whether an e-mail message is sent back or not within the waiting time after the information is transmitted. Therefore, the suitable waiting time may differ depending on, for example, whether the receiving-end terminal 5 is always connected to the mail server machine 4 as mentioned in the foregoing, the network environment (connection state to the server) including the transfer rate between the mail server machine 4 and the receiving-end terminal 5, and the settings of the receiving-end terminal 5 (as to response timing and other conditions).

Therefore, if the waiting time is set to a value suitable to the transmission destination with the slowest response speed so as to be compatible with all the transmission destinations, a situation is possible where the operator may not be notified quickly of an error which has occurred at the transmission destination (receiving end) with a fast response speed and take an undesirably long time before retransmitting the information. In contrast, if the waiting time is set to a value suitable to the transmission destination with the fastest response speed, a situation is possible where the receiving end has normally received the message, but may be so slow in the operation of sending a return message that it triggers timeout errors requesting repeated transmissions.

SUMMARY OF THE INVENTION

The present invention has an objective to provide a network communication device capable of specifying a suitable waiting time.

To achieve the objective, a network communication device in accordance with the present invention includes:

response verification means for, over a network, making a request to a transmission destination to return a response and verifying that the response has been made within a predetermined waiting time;

measuring means for measuring a response time from the making of the request to reception of the response; and changing means for changing the waiting time in accordance with a result of the measurement by the measuring means.

According to the arrangement, in a network communication device including delivery verification response means (delivery verification response function) which, upon the data transmission over a network, like mail transmission over the Internet, attaches, to the transmitted data, transmission information (response request) indicating that a response be made when the data is delivered, verifies that the response has been made within a predetermined waiting time, and alerts the operator to a delivery verification result, the changing means corrects the waiting time on the basis of the response time (from the making of the request for a return response to the reception of a response to the request) actually measured by the measuring means, for example, to a mean or maximum value of measured values.

A suitable waiting time can be thus specified.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

FIG. 15 is a table showing an example of recipient information whose settings are made as in FIG. 14.

DESCRIPTION OF THE EMBODIMENTS

The following will describe the first embodiment in accordance with the present invention in reference to FIGS. 1-7.

Figure 1:
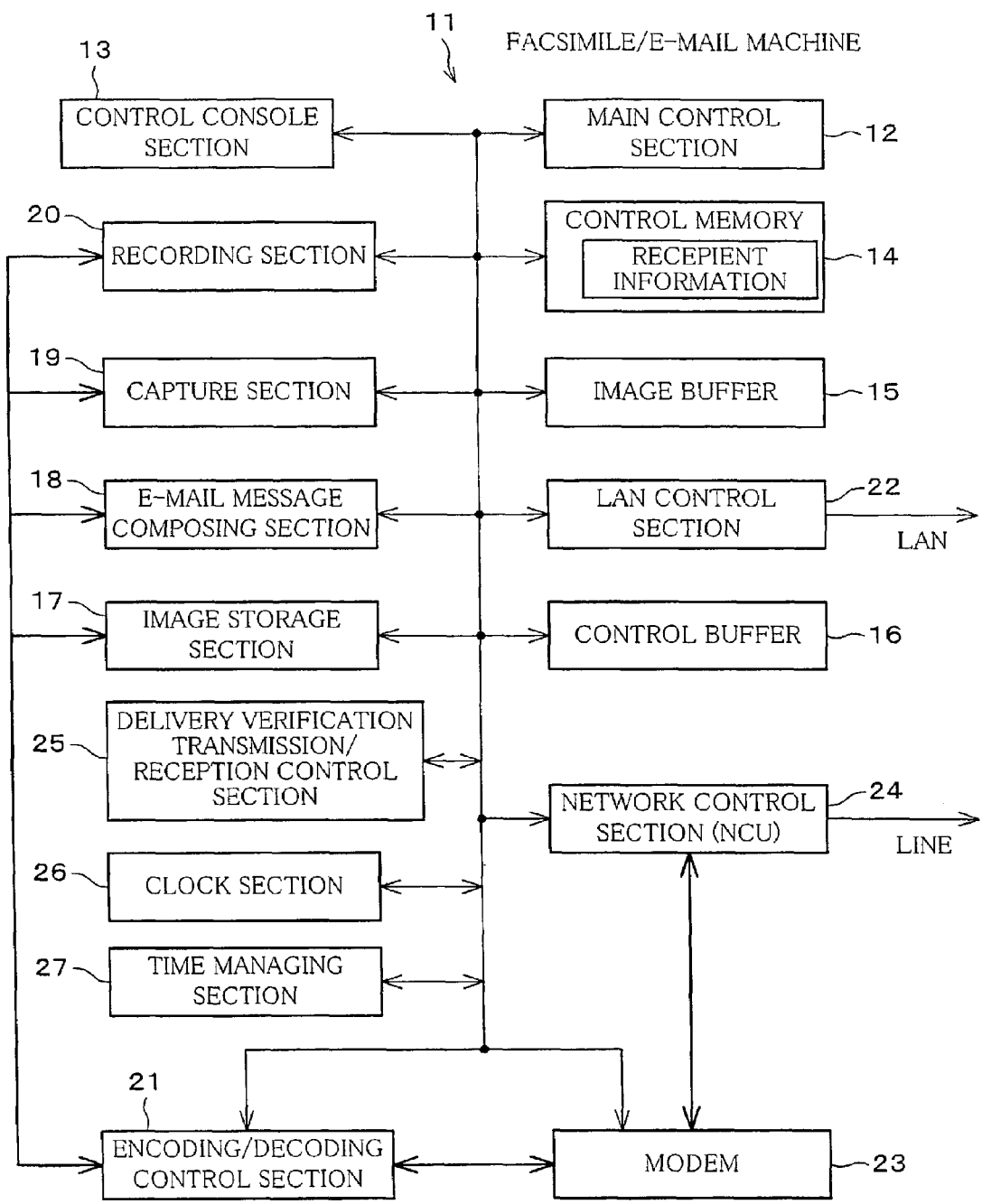
FIG. 1 is a block diagram showing an electrical arrangement of a facsimile/e-mail machine (network communication device) of a first embodiment in accordance with the present invention.

FIG. 1 is a block diagram showing an electrical arrangement of a facsimile/e-mail machine, or network communication device, 11 of the first embodiment in accordance with the present invention. The facsimile/e-mail machine 11 has functions as a printer/copying machine which prints data on a recording medium and an ordinary facsimile (fax machine) which operates over telephone lines, as well as those as an e-mail (e-mail/FTP (File Transfer Protocol)) machine which exchange e-mail messages and files with a server over the Internet or like network and an Internet facsimile machine. The function as the Internet facsimile machine will be discussed later in detail.

The facsimile/e-mail machine 11 is primarily made up of a main control section 12, a control console section 13, a control memory 14, an image buffer 15, a control buffer 16, an image storage section 17, an e-mail message composing section 18, a capture section 19, a recording section 20, an encoding/decoding control section 21, an LAN (Local Area Network) control section 22, a modem 23, a network control section (NCU, Network Control Unit) 24, a delivery verification transmission/reception control section 25, a clock section 26, and a time managing section 27.

The main control section 12 includes a CPU (Central Processing Unit) and other components, to control the overall operation of the facsimile/e-mail machine 11. The control console section 13 provides a means of giving instructions for character recognition, recipient input, and other actions (details will be discussed later).

The control memory 14 is made up of ROM or other involatile memory, or backed-up volatile memory, and related devices, holding control programs and recipient information (telephone numbers, short numbers, etc. of transmission destinations). The image buffer 15 is made up of RAM and related devices, offering temporary storage in the compression and decompression of image data to be transmitted/received. The control buffer 16 is made up of RAM and related devices, holding data required to run control programs. The image storage section 17 stores encoded image and other data, including data fed from the capture section 19 (detailed later), received data, and decoded data.

The e-mail message composing section 18 converts encoded image data to an e-mail compatible format by adding header information to the data. The capture section 19 is a scanner based on opto-electric transducers, or charge coupled devices (CCDs), as document capture means, capturing a document image at a predetermined resolution for dot image data output. The recording section 20 includes an electrophotographic printing machine, making a hard copy of (printing) data, such as document images received through communications and captured by the capture section 19.

The encoding/decoding control section 21 encodes captured document image data and decodes incoming data. More specifically, the encoding/decoding control section 21 encodes/compresses document image data captured by the capture section 19 and decodes incoming encoded/compressed document image data to restore the original data. With the encoding/decoding control section 21 can be employed encoding schemes commonly used in facsimile communications, such as MH (Modified Huffman), MR (Modified READ), and MMR (Modified Modified READ).

The LAN control section (retransmission means) 22 acts to connect to the LAN (Local Area Network) for e-mail and facsimile communications over the Internet. The modem 23 provides a means of performing ordinary facsimile communications and is made up of a facsimile modem capable of facsimile communications. The modem 23 is connected to a public telephone line via a network control section 24. The network control section 24 is hardware implementing line control operation by closing and opening a line involving an analog public telephone line network (PSTN) to connect the modem 23 to the public telephone line network where necessary.

The delivery verification transmission/reception control section (response verification means) 25 provides a means of making a request for a delivery verification (delivery verification response) by MDN and managing the received delivery verification responses, and is controlled using the header information added by the e-mail message composing section 18. Specifically, the delivery verification transmission/reception control section 25 rewrites the header information which in the present embodiment includes a request for a delivery verification response (response). The clock section 26 provides a means of measuring an elapsed time (response time) from the transmission of a request for a delivery verification to the reception of a delivery verification response by measuring, for example, a timeout (detailed later). The time managing section 27 is changing means to store the time elapsed before the reception of a delivery verification response as measured by the clock section 26 and, as will be detailed later, specifying, in accordance with that time, a waiting time based on which an occurrence of a timeout error is determined.

Figure 2:
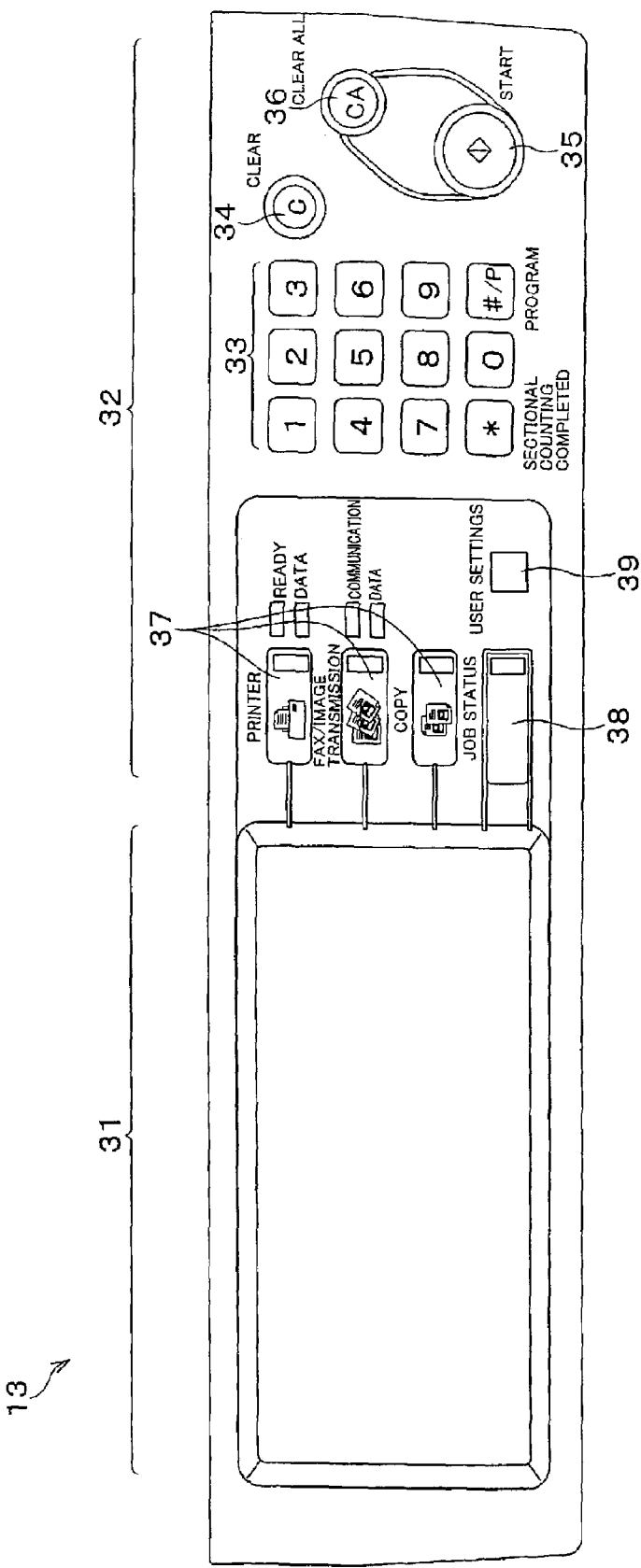
FIG. 2 is a drawing showing, as an example, a layout of a control console section on the facsimile/e-mail machine in FIG. 1.

Next, the arrangement of the control console section 13 is described in reference to FIG. 2. The control console section 13 includes a display unit 31 and operation unit 32 which are constructed into an integrated touch panel console. In facsimile transmit, settings are made for a recipient (recipient information) and stored in the control memory 14. The display unit 31 is built around a liquid crystal display (LCD) or a cathode ray tube (CRT), for example, to display an operation status, information on a transmission destination, etc., by means of numbers, symbols, and images. The operation unit 32 has various keys (input means) required to input settings and conditions and specifying operations for the facsimile/e-mail machine 11.

The operation unit 32 has, among others, ten keys 33, a clear key 34, a start key 35, a clear-all key (CA key) 36, mode selection keys 37, a job status display key 38, and a user settings key 39. The display unit 31 is a touch panel which displays various keys to receive input of settings through them.

The ten keys 33 provides a means of inputting a destination facsimile (telephone) number, the number of images to be formed, and the number of copies to be made. The clear key 34 provides a means of clearing the information which is input through the ten keys 33. The start key 35 is a key to start an operation of outputting an image onto a recording medium. The clear-all key 36 is a key to clear all the specified conditions.

The mode selection keys 37 include keys which are associated with corresponding modes: e.g., a printer key to set off a printer mode in which the machine 11 operates as a printer which outputs data received over the Internet, a facsimile/image transmission key to set off a facsimile mode in which it operates as a facsimile transmitting data to other apparatus via telephone lines or the Internet, and a copying machine key to set off a copy (copy) mode in which it operates as a copying machine which prints image data captured from a document on a recording medium. The operator selects one of functions of the facsimile/e-mail machine 11 by selecting one of these keys. The job status display key 38 is a key to selectively display the current image forming job status.

The following will describe the function of the facsimile/e-mail machine 11 as an Internet facsimile machine. For the facsimile/e-mail machine 11 to transmit facsimile document data (image data) as an Internet facsimile machine, the encoding/decoding control section 21 encodes facsimile document data, and the e-mail message composing section 18 converts the encoded facsimile document data into the TIFF file format and adds header information to the converted data, so that the data format is compatible with e-mail.

Figure 17:
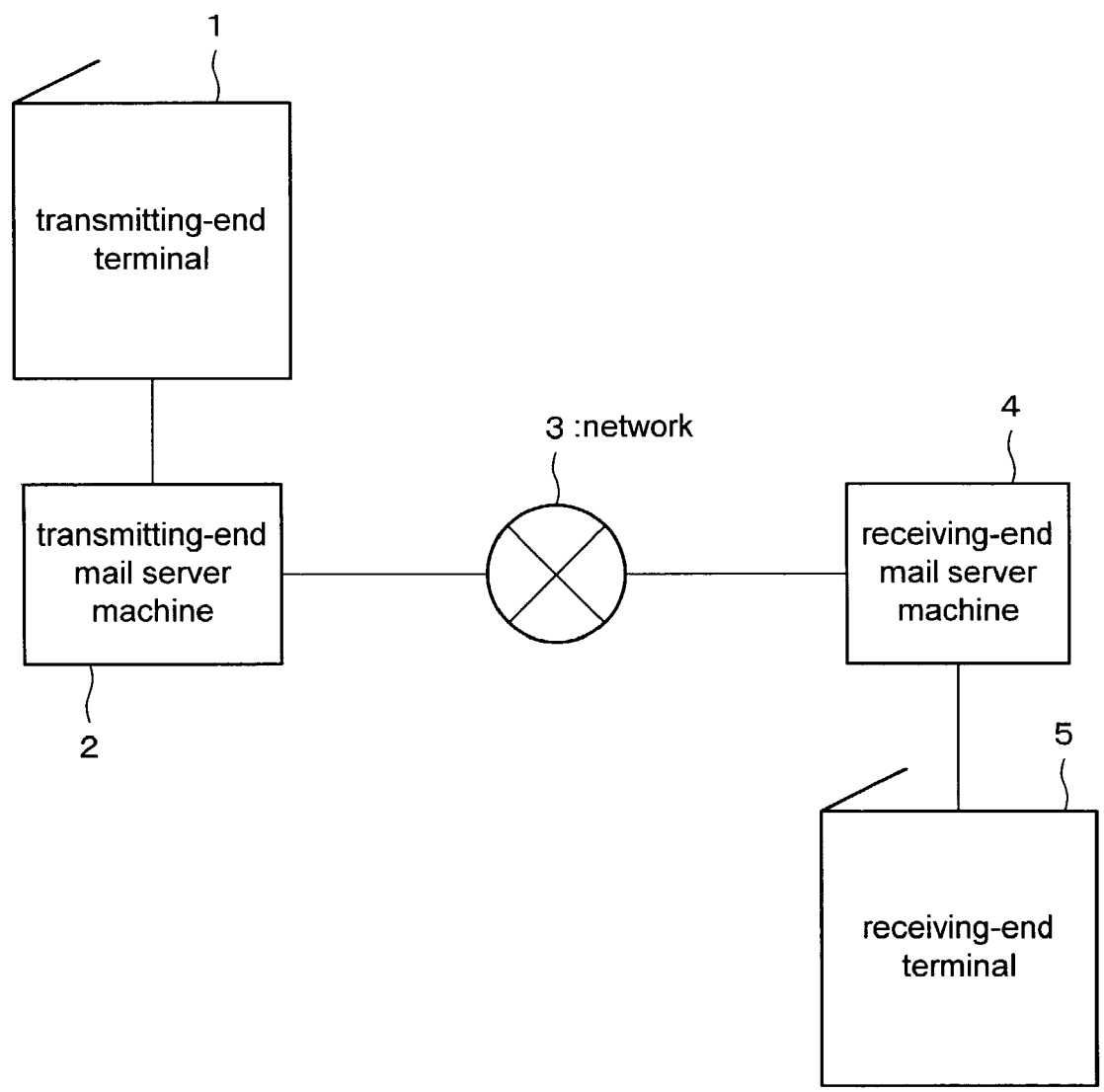
FIG. 17 is a block diagram schematically showing a configuration of a network facsimile machine.

In other words, the Internet facsimile machine composes an e-mail message by attaching facsimile document data to the e-mail address to which the facsimile document data is transmitted. Then, the machine either connects to the Internet provider (the mail server machine 2 at the transmitting end in FIG. 17) through, for example, public telephone lines and onto the Internet through that host or connects directly to the Internet, to transfer the e-mail message to a mail server on the network (receiving-end mail server machine 4 in FIG. 17).

The e-mail message is transmitted/received by both the present facsimile/e-mail machine at the transmitting end (transmitting-end terminal 1 in FIG. 17) and the facsimile/e-mail machine at the receiving end (receiving-end terminal 5 in FIG. 17) connecting to the Internet.

The facsimile/e-mail machine 11 is equipped with an MDN function notifying an operation status by a message after successful delivery. MDN, as mentioned in the foregoing, refers to a function to verify successful delivery of an e-mail message to the facsimile/e-mail machine at the receiving end by causing that machine to send back a delivery verification response to the facsimile/e-mail machine at the transmitting end.

Accordingly, in the facsimile/e-mail machine 11, the e-mail message composing section 18 adds an MDN field to the header section of an e-mail message for use by the delivery verification transmission/reception control section 25 and writes in the MDN field the address (address or number of the facsimile/e-mail machine at the transmitting end) to which a verification message is sent, so as to make a request for a delivery verification response.

Figure 3:
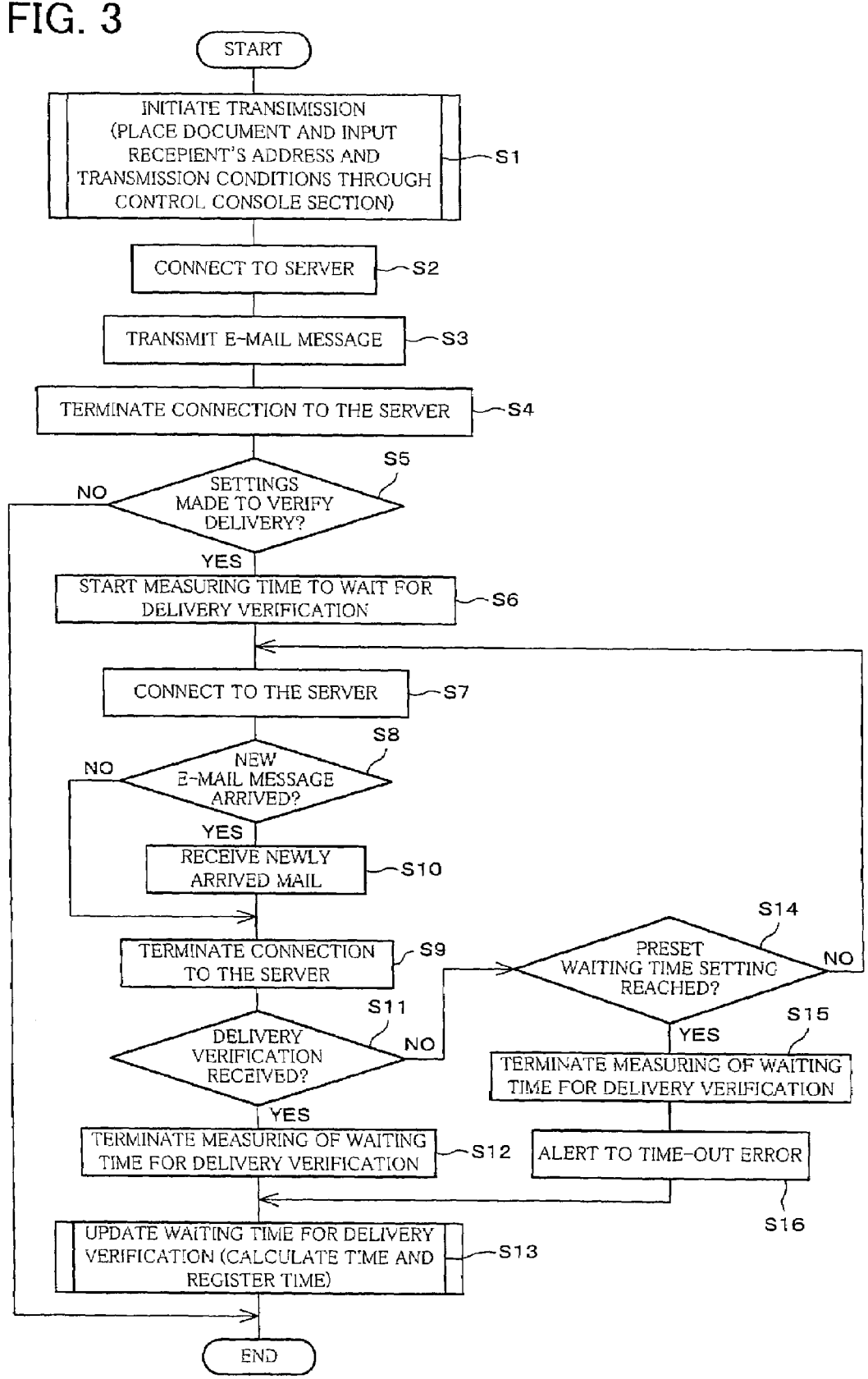
FIG. 3 is a flow chart showing an operation to transmit facsimile document data as an e-mail message.

Next, referring to FIGS. 3-6, a transmission operation will be described where the facsimile/e-mail machine at the transmitting end transmits facsimile document data in the form of an e-mail message to the facsimile/e-mail machine at the receiving end. FIG. 3 is a flow chart illustrating an operation of the facsimile/e-mail machine at the transmitting end during transmission of an e-mail message. First, as the facsimile/e-mail machine at the transmitting end starts the transmission operation, step S1 places a document on the capture section 19 and inputs the address of the transmission destination and other transmission conditions through the control console section 13. Step S2 connects the network control section 24 to the Internet (server), and step S3 transmits the e-mail message composed by the e-mail message composing section 18.

Following the completion of the transmission, step S4 terminates the connection to the Internet (server). Here comes one of features of the present invention to which attention should be paid. Step S5 causes the delivery verification transmission/reception control section 25 to determine whether settings have been made to verify delivery. If no settings have been made, the operation is terminated; if settings have been made, the operation continues at step S6 which causes the clock section 26 to start measuring the waiting time for delivery verification.

After every predetermined period of time, step S7 reconnects to the Internet (server) and step S8 causes the delivery verification transmission/reception control section 25 to determine whether an e-mail message verifying the delivery has arrived. If such a message has not arrived, the operation continues at step S9 which terminates the connection to the Internet (server); if such a message has arrived, step S10 causes the delivery verification transmission/reception control section 25 to receive newly arrived mail, and the operation continues at step S9.

Step S9 terminates the connection to the Internet (server), and the operation continues at step S11 which causes the delivery verification transmission/reception control section 25 to determine whether a delivery verification response has been received. If received, step S12 terminates the measuring of the waiting time for delivery verification by the clock section 26, and the operation continues at step S13. Step S13 stores the time measured by the clock section 26 in the control memory 14 and causes the time managing section 27 to specify a waiting time for a next transmission in accordance with that time as in the following, before terminating the operation.

Meanwhile, if no delivery verification response has been received in step S11, the operation continues at step S14 which causes the clock managing section 27 to determine whether the measured time measured by the clock section 26 has reached the preset waiting time. If not, the operation returns to step S7 which reconnects to the Internet (server) after every predetermined period to check whether any new messages have arrived; if so, the clock managing section 27 determines that a timeout error has occurred, and the operation continues to step S15 which terminates the measuring of the waiting time for delivery verification by the clock section 26. Then, step S16 alerts the operator to the timeout error through the display unit 31 in the control console section 13, and the operation continues at step S13 which causes the clock managing section 27 to specify a waiting time for a next transmission, before terminating the operation.

Figure 4:
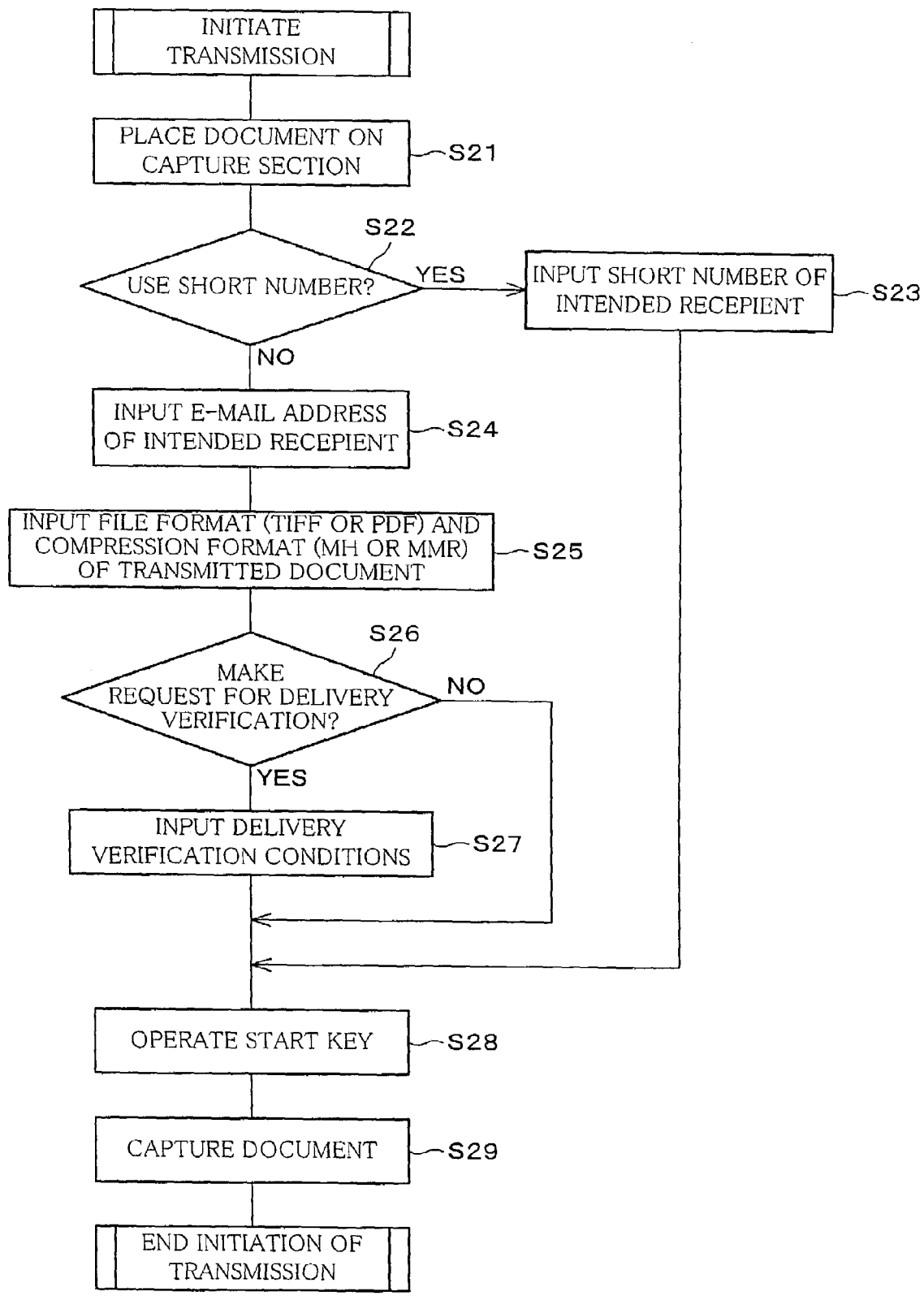
FIG. 4 is a flow chart showing in detail a part of the transmission operation in FIG. 3 where a transmission is initiated.

FIG. 4 is a flow chart showing transmission initiation in step S1 in greater detail. Step S21 places a document to be transmitted in the form of an e-mail message on the capture section 19. Step S22 determines whether an short number stored in the control memory 14 representing recipient information is to be used. If an short number is to be used, step S23 inputs it using the ten keys and the single press key.

If no short number is to be used, the operation continues at step S24 which directly inputs the e-mail address of the transmission destination through the operation unit 32. Step S25 then inputs the file format, such as TIFF or PDF, and compression format, such as MH or MMR, of the transmitted document. Step S26 determines whether a request is to be made for a delivery verification. If such a request is to be made, step S27 inputs a waiting time and other conditions, before the operation continues at step S28; if not, the operation directly continues at step S28.

Following step S23, the operation continues also at step S28 which operates the start key 35 and at step S29 which captures the document in response to the start key operation.

Figure 5:
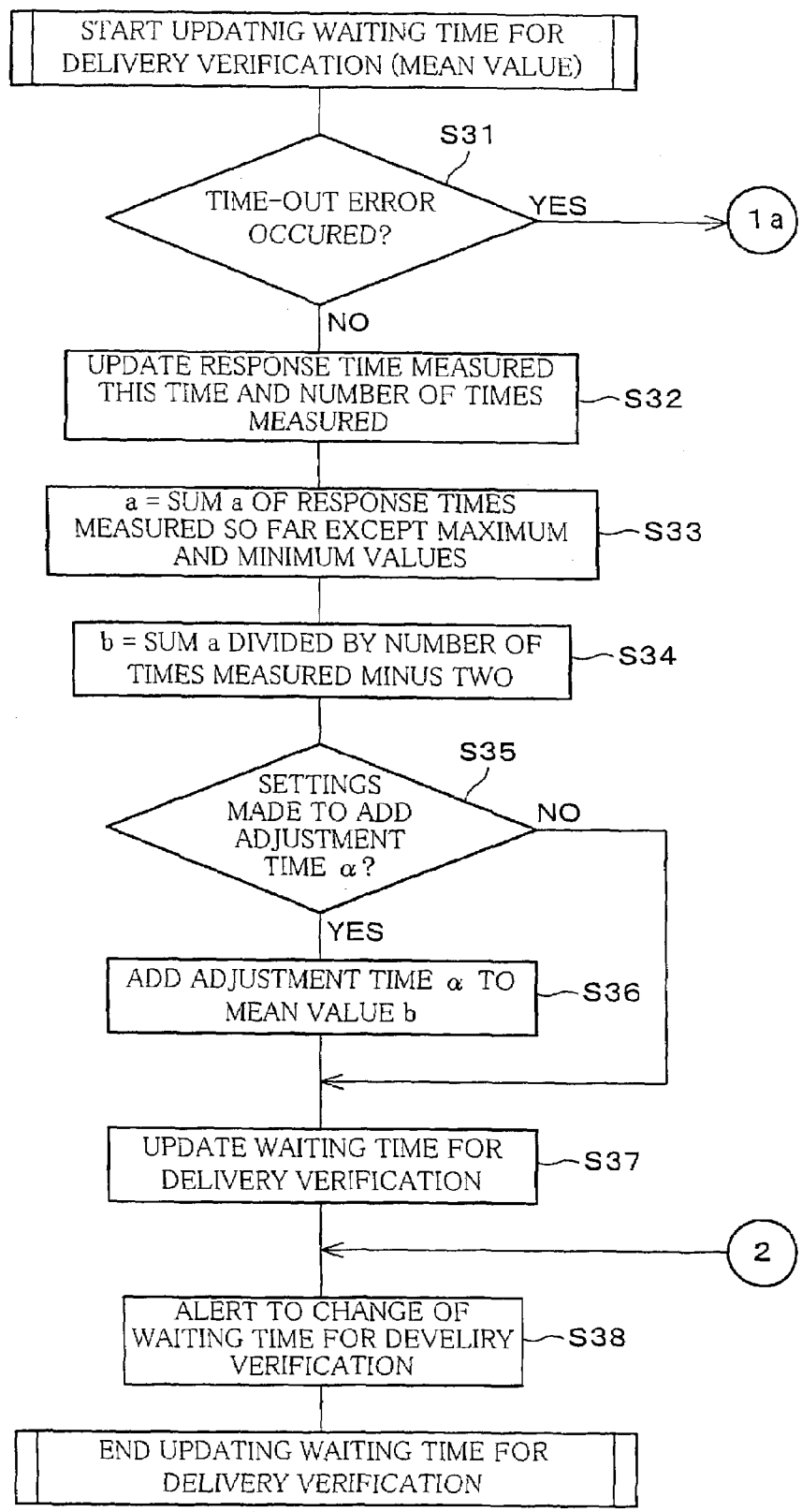
FIG. 5 is a flow chart showing in detail a part of the transmission operation in FIG. 3 where the waiting time is set for a next transmission.
Figure 6:
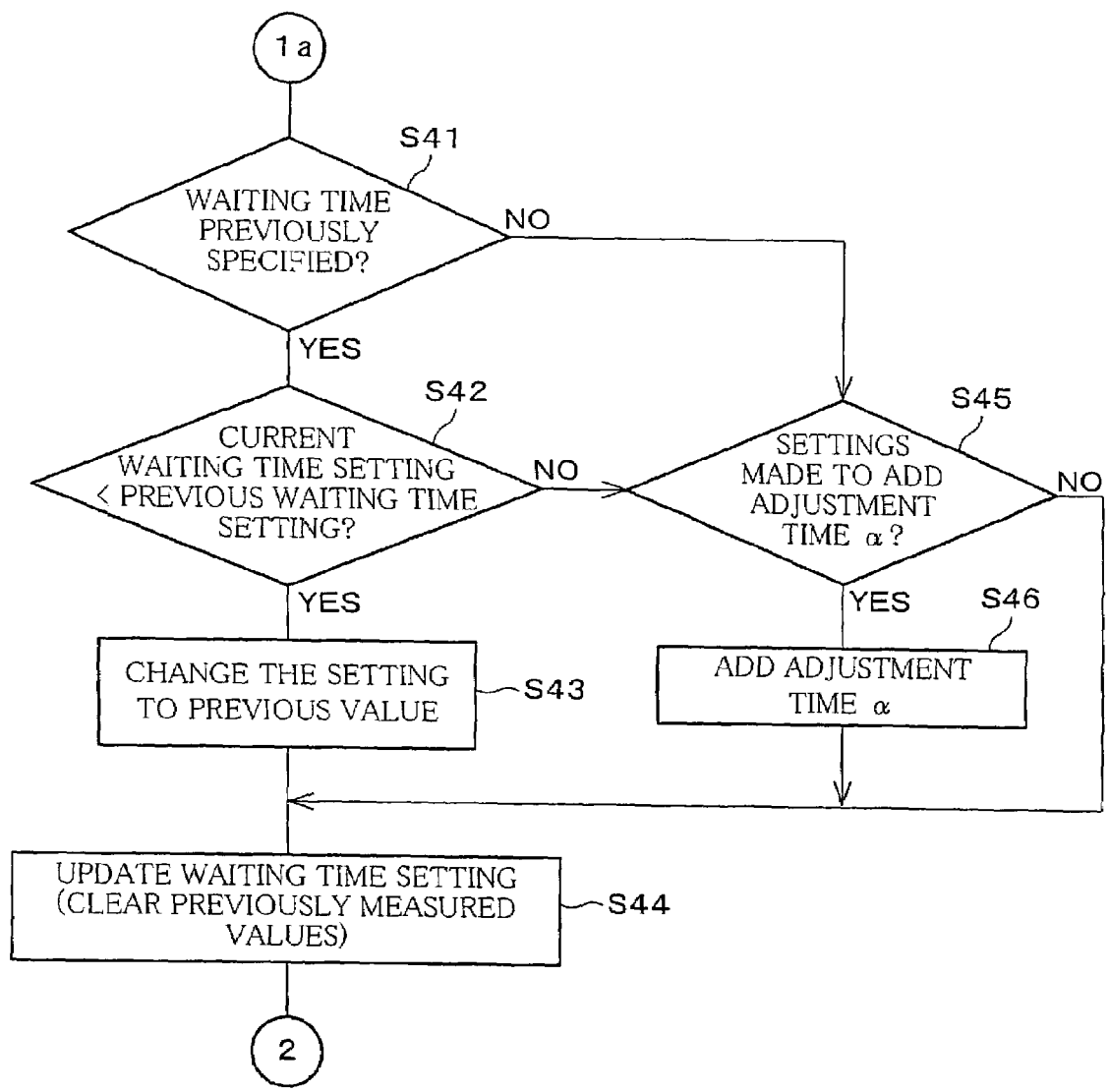
FIG. 6 is a flow chart showing in detail a part of the transmission operation in FIG. 3 where the waiting time is set for a next transmission.

FIGS. 5, 6 are flow charts illustrating in greater detail step S13 causing the clock managing section 27 to specify a waiting time for a next transmission. First, step S31 determines whether a timeout error has occurred. If not, the operation continues at step S32 which updates the response time measured by the clock section 26 this time (from the request for a response to the reception of a response to the request) and data on the number of times the response time has been measured. Step S33 calculates the sum "a" of the response times measured so far except maximum and minimum values. Step S34 divides the sum "a" with the number of times the response time has been measured less two (the subtraction of two corresponds to the maximum and minimum measurements) to obtain a mean value "b" of all the response times less the maximum and minimum values.

Step S35 determines whether settings have been made to add an adjustment time α. If such settings have been made, step S36 adds the adjustment time α to the mean value "b", before the operation continues at step S37; if not, the operation directly continues at step S37. Step S37 updates and stores the waiting time. That is, if settings have been made to add an adjustment time α, the clock managing section 27 sets the waiting time to the sum of the mean value "b" and the adjustment time α; if settings have not been made to add an adjustment time α, the clock managing section 27 sets the waiting time to the mean value "b". Then, step S38 causes the display unit 31 of the control console section 13 to alerts the operator to the change of the waiting time, before terminating the setting of a waiting time for a next transmission.

In contrast, if a timeout error has occurred in step S31, the operation continues at step S41 which determines whether the waiting time has been previously specified. If step S41 determines that the waiting time has been previously specified, the operation continues at step S42 which determines whether the current waiting time setting is shorter than the previous waiting time setting. If shorter, the operation continues to step S43 which sets the waiting time back to the previous waiting time setting. Further, step S44 updates the waiting time to reflect the outcome of S43, and deletes all the measurement results from the storage because of the occurrence of a timeout error.

In contrast, if step S41 determines that the waiting time has previously never been specified, i.e., the waiting time remains as set initially, the operation continues at step S45. The operation continues at step S45 also if step S41 determines that the waiting time has been previously specified, but step S42 determines that the current waiting time setting is not shorter than the previous waiting time setting. Step S45 then determines whether settings have been made to add an adjustment time α to the current waiting time setting. If such settings have been made, step S46 adds the adjustment time α and hence updates the waiting time, before the operation continues at step S44; if not, the operation directly continues at step S44.

Figure 7:
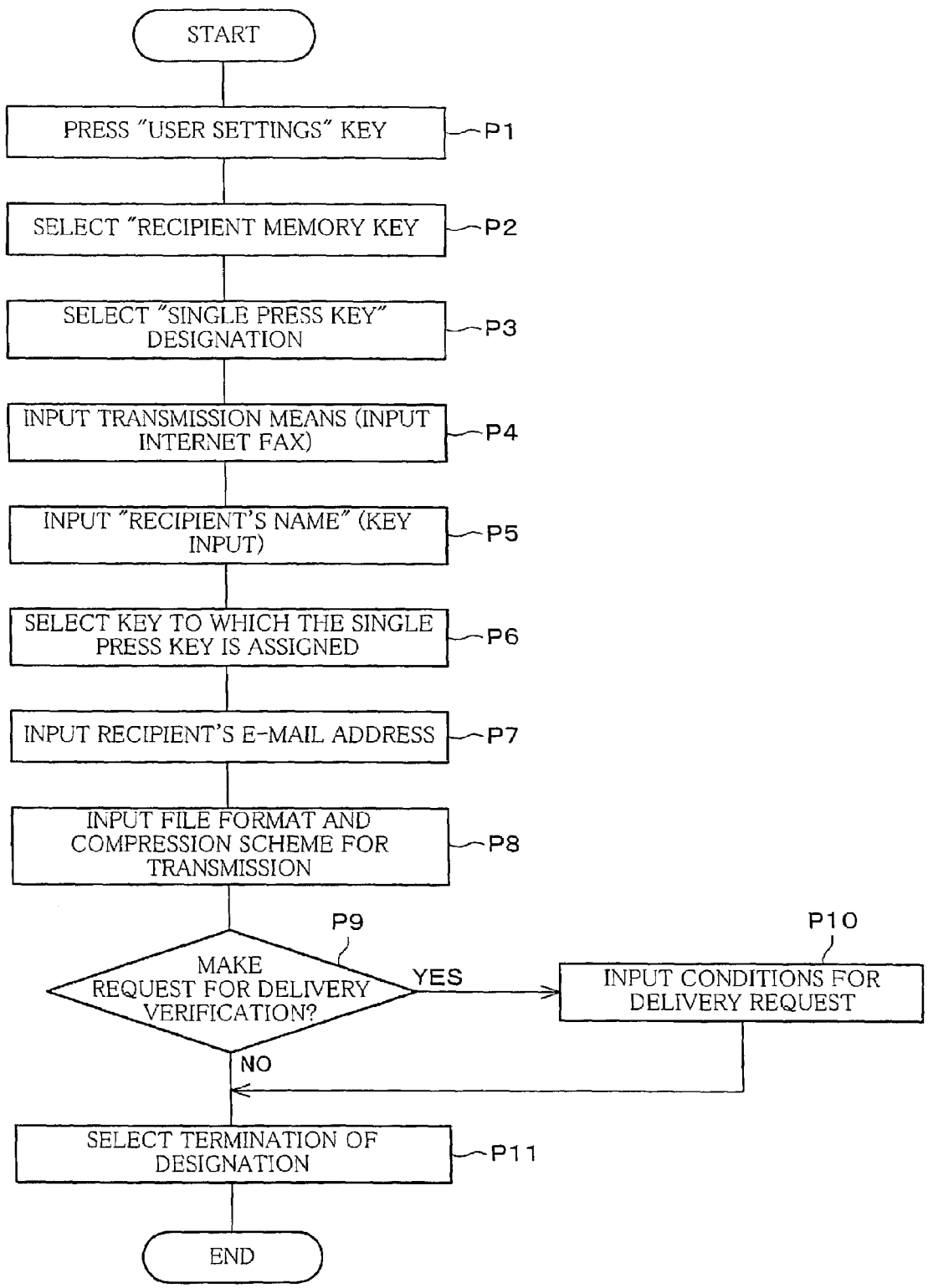
FIG. 7 is a flow chart showing a method of setting speed dialing in the transmission operation in FIG. 3.

FIG. 7 is a flow chart illustrating a method of specifying the speed dialing. Step P1 operates the "user settings" key 39 to turn the machine into setting mode, allowing inputs through the display unit 31 as a touch panel in the following process.

Step P2 selects the "Recipient Memory Key," and step P3 selects "Single Press Key" designation. Then, step P4 selects transmission means, i.e., either facsimile transmission over normal public telephone lines or the Internet facsimile.

Step P5 inputs a "Recipient's Name," and step P6 specifies a key to which the Single Press Key is assigned. Step P7 inputs an e-mail address of the recipient, and step P8 inputs a suitable file format and compression scheme to the machine of the recipient.

Subsequently, step P9 determines whether to make a request for a delivery verification. If a request is to be made, step P10 inputs conditions for that request, and the operation continues at step P11 which inputs a termination of the designation. If no request is to be made for a delivery verification, the operation shifts directly from step P9 to step P11.

As in the foregoing, the facsimile/e-mail machine 11 in accordance with the present invention can specify a suitable waiting time, by transmitting facsimile data to which a request for a delivery verification response is attached in steps S1-S4, measuring a time elapsed before a delivery verification is received in response to the request using the clock section 26 in steps S6-S12, and changing the waiting time for a next transmission in accordance with the measurement using the time managing section 27 in step S13.

The adjustment time α may be defined as by, for example, automatically calculating 10% of the specified waiting time or 10% of the difference between the last (prior to change) delivery verification waiting time and the delivery verification waiting time measured this time.

A suitable margin can be provided to the waiting time by further adding, in step S36, the adjustment time α to the mean value "b" obtained in steps S33, S34.

Further, if an timeout error occurs where the waiting time elapses without receiving a response, the time managing section 27 extends the waiting time for a next transmission in steps S43, S45, rendering the timeout error less likely to occur.

If the last waiting time is longer than the current waiting time in step S42, the time managing section 27 restores the waiting time to the last value in step S43, further rendering the timeout error less likely to occur through the use of the lastly used, tested value.

In the case of a timeout error occurrence, chances are that communications environment have greatly changed. Therefore, if the specified waiting time has elapsed without receiving a response, step S44 deletes the times measured previously, allowing specification of a new, suitable waiting time freely from the mean value "b" and other data from the past.

The foregoing description illustrates an example of attaching a request for a delivery verification response to an e-mail message (data), transmitting data containing the delivery verification response request, measuring a response time to receive a delivery verification in response to a request using the clock section 26, and varying the waiting time in accordance with the measurement by the clock section 26 using the clock managing section 27. However, as in the foregoing, the arrangement where the response time from the transmission of a request for a delivery verification response to the reception of a delivery verification response is measured and then changed is not limited to the foregoing description. The operation may be performed, for example, prior to the transmission of the e-mail message (data). Specifically, the network communication device in accordance with the present invention may be a network communication device with a response verification function whereby in transmitting data over a network, a request for a response is made with a transmission destination, and reception of a response is verified within a predetermined waiting time, and arranged to include: measuring means for measuring a time elapsed from the making of a request for a response to the reception of a response for this request; and changing means for changing the waiting time in accordance with a measurement by the measuring means.

To explain the arrangement in more detail, a response request for a response from the transmission destination may be prepared separately from the data. Then, only the response request may be transmitted to the transmission destination before transmission of the data.

When this is the case, the response request is transmitted to the transmission destination between step S2 and step S3 in the flow chart in FIG. 3. The time after the transmission of the response request to the reception of a response for the response request may be measured using the clock section 26 so that the waiting time can be changed using the time managing section 27 in accordance with the measurement using the clock section 26.

Before the transmission of the e-mail message (data), the operation of changing the waiting time may be performed together with the operation in step S5 to S13. Alternatively, only the operation of changing the waiting time can be performed by transmitting a response request.

Besides, for example, a delivery verification response request for a delivery verification response indicating whether the transmission destination has received the data may be prepared separately from the data and transmitted after the transmission of the data from the transmitting end.

Figure 8:
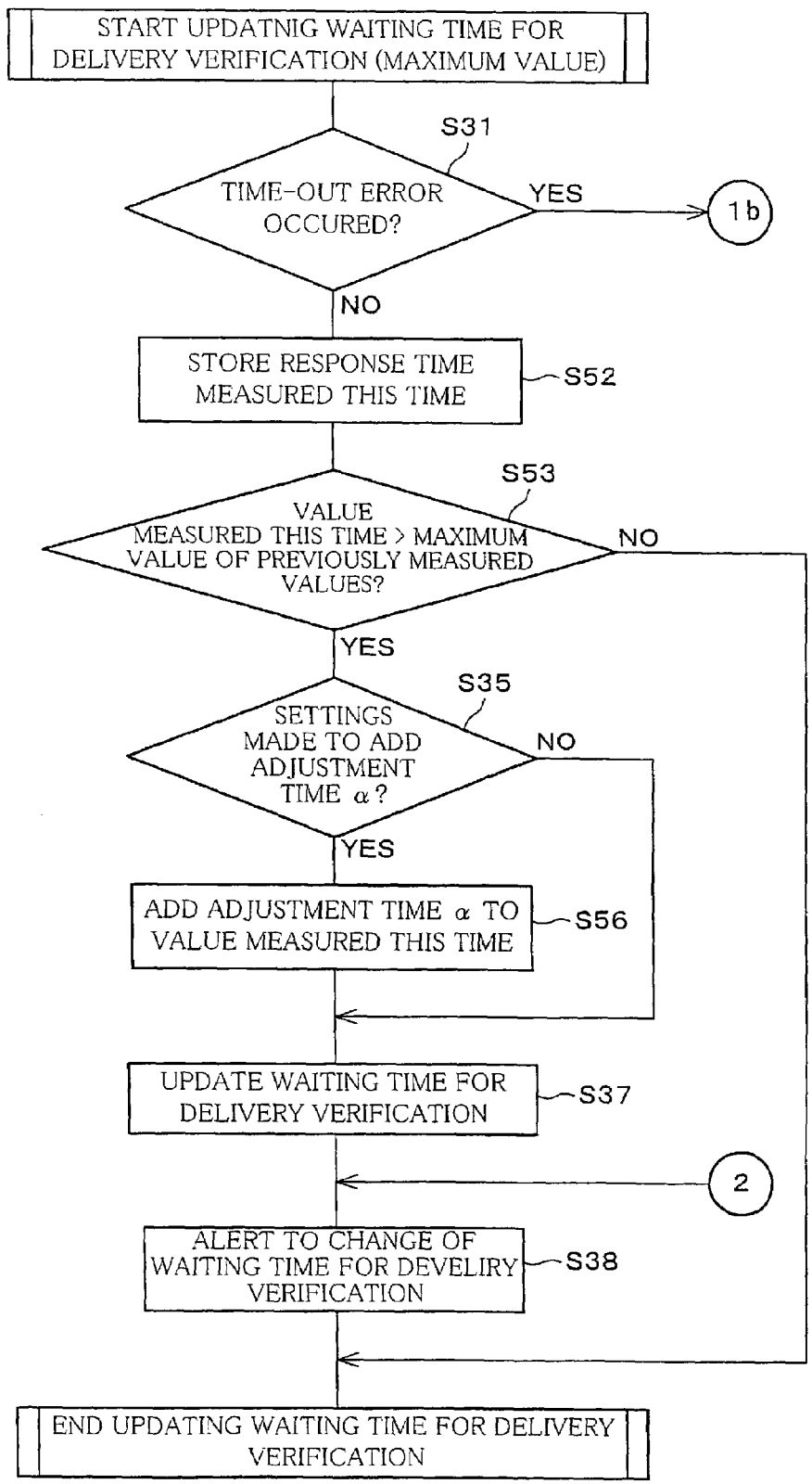
FIG. 8 is a flow chart showing in detail of an operation of a facsimile/e-mail machine (network communication device) of a second embodiment in accordance with the present invention where the waiting time is set for a next transmission.
Figure 9:
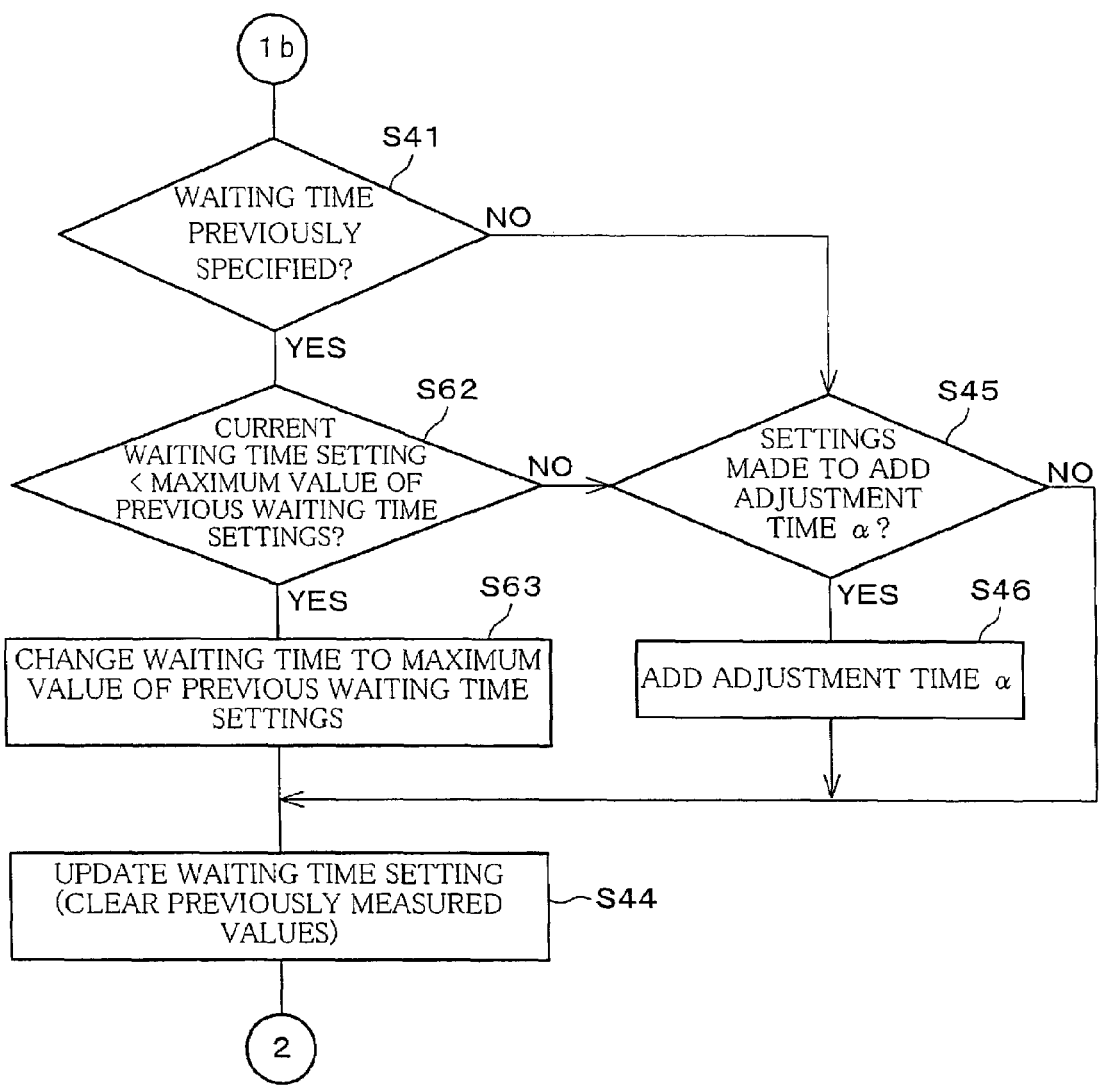
FIG. 9 is a flow chart showing in detail of an operation of a facsimile/e-mail machine (network communication device) of the second embodiment in accordance with the present invention where the waiting time is set for a next transmission.

The following will describe the second embodiment in accordance with the present invention in accordance with FIG. 8 and FIG. 9.

FIG. 8 and FIG. 9 are flow charts illustrating in detail an operation of specifying a waiting time for a next transmission as performed by a facsimile/e-mail machine 11 which is a network communication device of the second embodiment in accordance with the present invention. Similarly to FIG. 5 and FIG. 6 above, FIG. 8 and FIG. 9 show in detail a part of the transmission operation by the clock managing section 27 in step S13 in FIG. 3. Those steps which are similar or corresponding to the operation in FIG. 5 and FIG. 6 are assigned identical reference symbols, and description thereof is omitted.

Attention should be paid to the fact that after step S52 which stores the response time measured this time, the operation here continues at step S53 which determines whether the response time measured this time is longer than a maximum value of the response times measured previously, and if longer, directly terminates and if shorter, continues at step S35. It is then determined whether settings have been made to add an adjustment time α; if such settings have been made, the operation continues at step S56 which adds the adjustment time α to the value measured this time and proceeds to step S37; if not, the operation continues directly at step S37.

Meanwhile, if there has occurred a timeout error in step S31, the operation continues at step S41 which determines whether there are any previous waiting time settings; if there is, the operation continues at step S62 which further determines whether the current waiting time setting is shorter than a maximum value of the previous waiting time settings. If shorter, the operation continues at step S63 which changes the waiting time to that maximum value, before proceeding to step S44.

When there has occurred a timeout error in this manner, the likelihood of any more timeout errors can be further reduced by changing the waiting time to the greatest one of all the previous waiting time settings.

Figure 10:
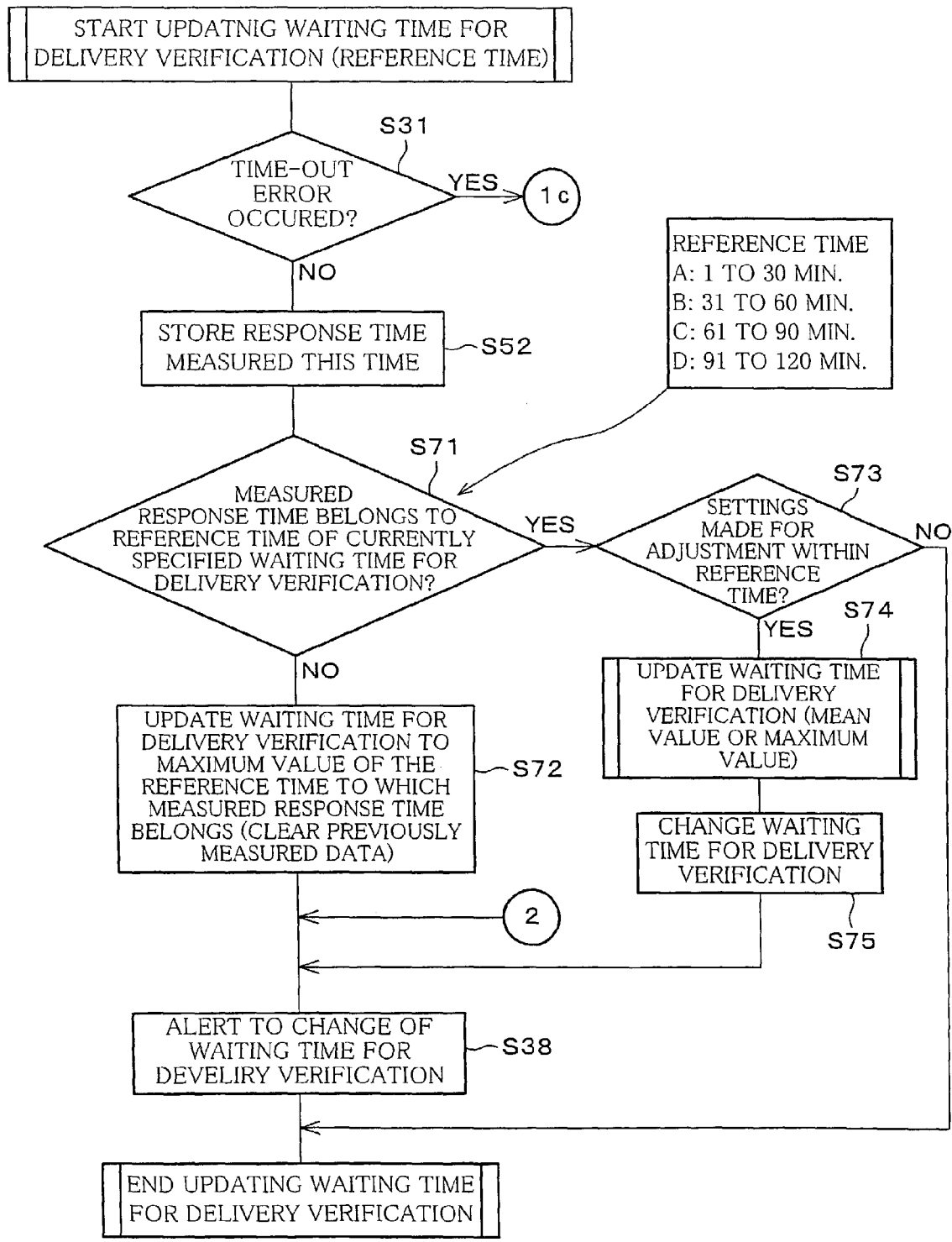
FIG. 10 is a flow chart showing in detail of an operation of a facsimile/e-mail machine (network communication device) of a third embodiment in accordance with the present invention where the waiting time is set for a next transmission.
Figure 11:
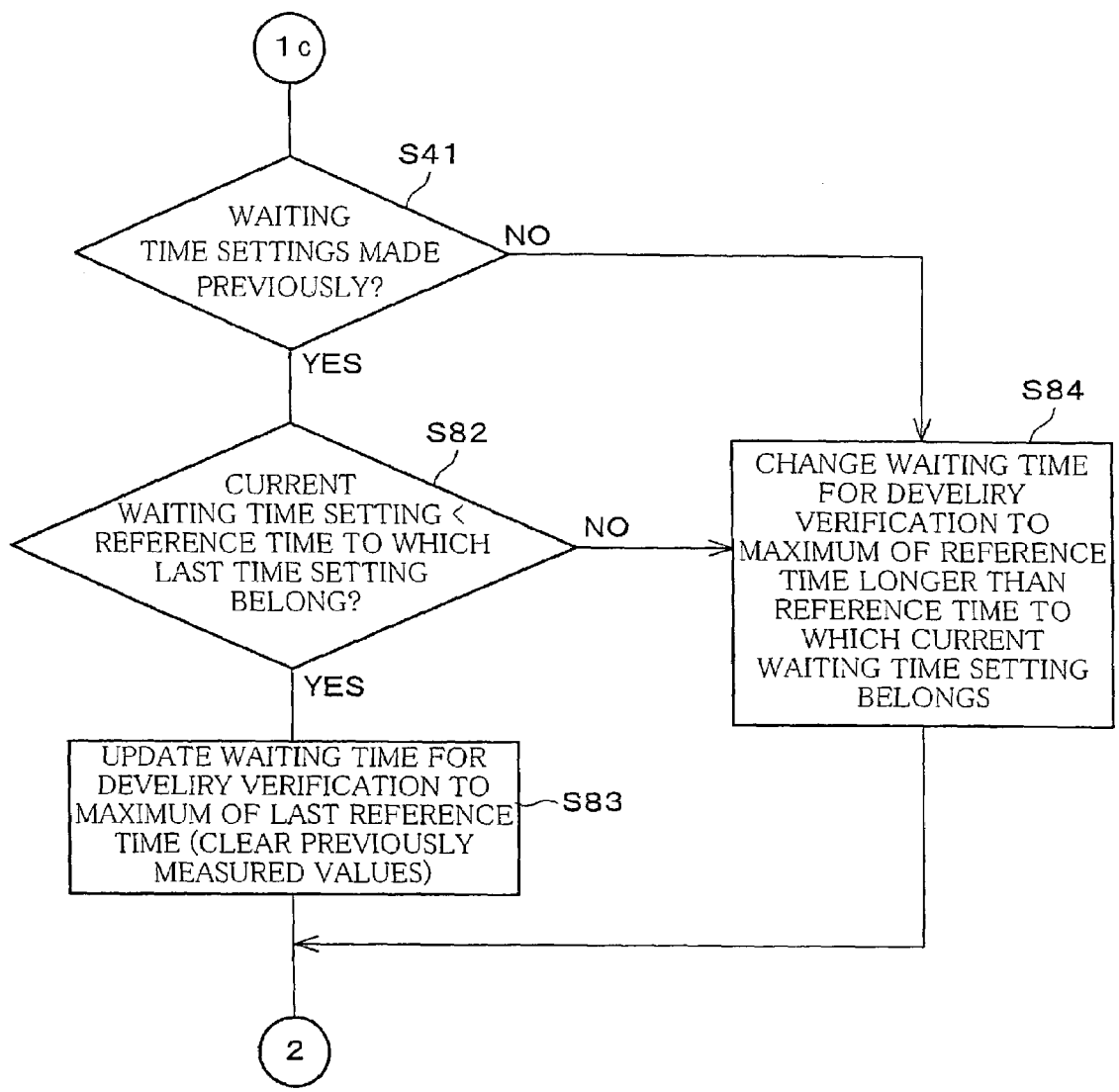
FIG. 11 is a flow chart showing in detail of an operation of a facsimile/e-mail machine (network communication device) of the third embodiment in accordance with the present invention where the waiting time is set for a next transmission.

The following will describe the third embodiment in accordance with the present invention in reference to FIG. 10 and FIG. 11.

FIG. 10 and FIG. 11 are flow charts illustrating in detail an operation of specifying a waiting time for a next transmission as performed by a facsimile/e-mail machine 11 which is a network communication device of the third embodiment in accordance with the present invention. Similarly to FIG. 8 and FIG. 9 above, FIG. 10 and FIG. 11 show in detail a part of the transmission operation by the clock managing section 27 in step S13 in FIG. 3. Those steps which are similar or corresponding to the operation in FIG. 8 and FIG. 9 are assigned identical reference symbols, and description thereof is omitted.

Attention should be paid to the fact that in this operation, the waiting time is divided into multiple ranges of reference times and the waiting time is set to a maximum value within a reference time. That is, after step S52 stores the response time measured this time, the operation continues at step S71 which determines whether the response time measured this time belongs to the current reference time setting. If not, the operation continues at step S72 which updates a waiting time for a next transmission to a maximum value of the reference time to which that measured response time belongs and proceeds to step S38. In contrast, if step S71 determines that the response time is within the reference time, step S73 determines whether settings have been made to make fine adjustment within the reference time. If no such settings have been made, the operation terminates with the response time remaining set to a maximum value of the reference time to which it belongs. If settings have been made to make the fine adjustment, step S74 updates that measured response time, such as the mean value "b" or the maximum value, to any given value within the reference time to which it belongs, and step S75 changes the response time, before the operation proceeds to step S38.

Meanwhile, if there has occurred a timeout error in step S31, the operation continues at step S41 which determines whether there are any previous waiting time settings; if there is, the operation continues at step S82 which further determines whether the current waiting time setting is shorter than the last reference time. If shorter, the operation continues at step S83 which changes the waiting time to a maximum value of the last reference time, before proceeding to step S38. In contrast, if step S41 determines that there are no previous waiting time settings, the operation continues at step S84 which changes it to a maximum value of the reference time longer than the reference time to which the current waiting time setting belongs, before proceeding to step S38.

The reference time may be, for example, 1 to 30 minutes for a first reference time A, 31 to 60 minutes for a second reference time B, 61 to 90 minutes for a third reference time C, and 91 to 120 minutes for a fourth reference time D. If, for example, a timeout error occurs in the first reference time A, the waiting time setting is changed to the second reference time B, i.e., 30 to 60 minutes.

Dividing the waiting time into multiple ranges of reference times and setting it to a maximum value within a reference time in this manner, instead of setting it to a continuously changing value, enables the waiting time to be set to a reasonably wide range of values. Thus, even if the actual response time varies for each transmission due to communication status, a margin is provided which prohibits small variations in the waiting time caused by minor changes in communication status and thus makes the waiting time stable.

The following will describe the fourth embodiment in accordance with the present invention in reference to FIG. 12 to FIG. 15.

Figure 12:
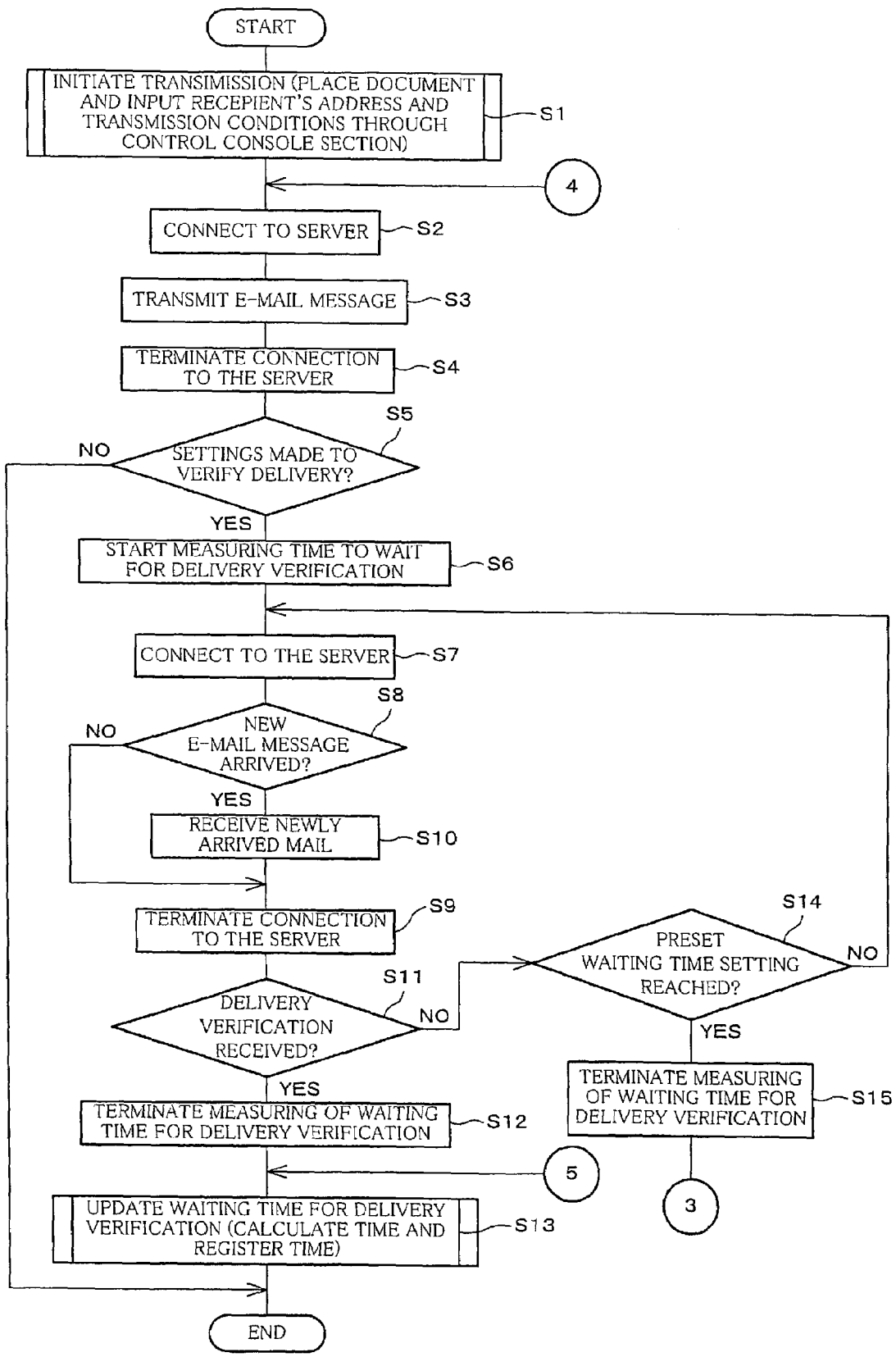
FIG. 12 is a flow chart showing an operation on transmission of a facsimile/e-mail machine (network communication device) of a fourth embodiment in accordance with the present invention.
Figure 13:
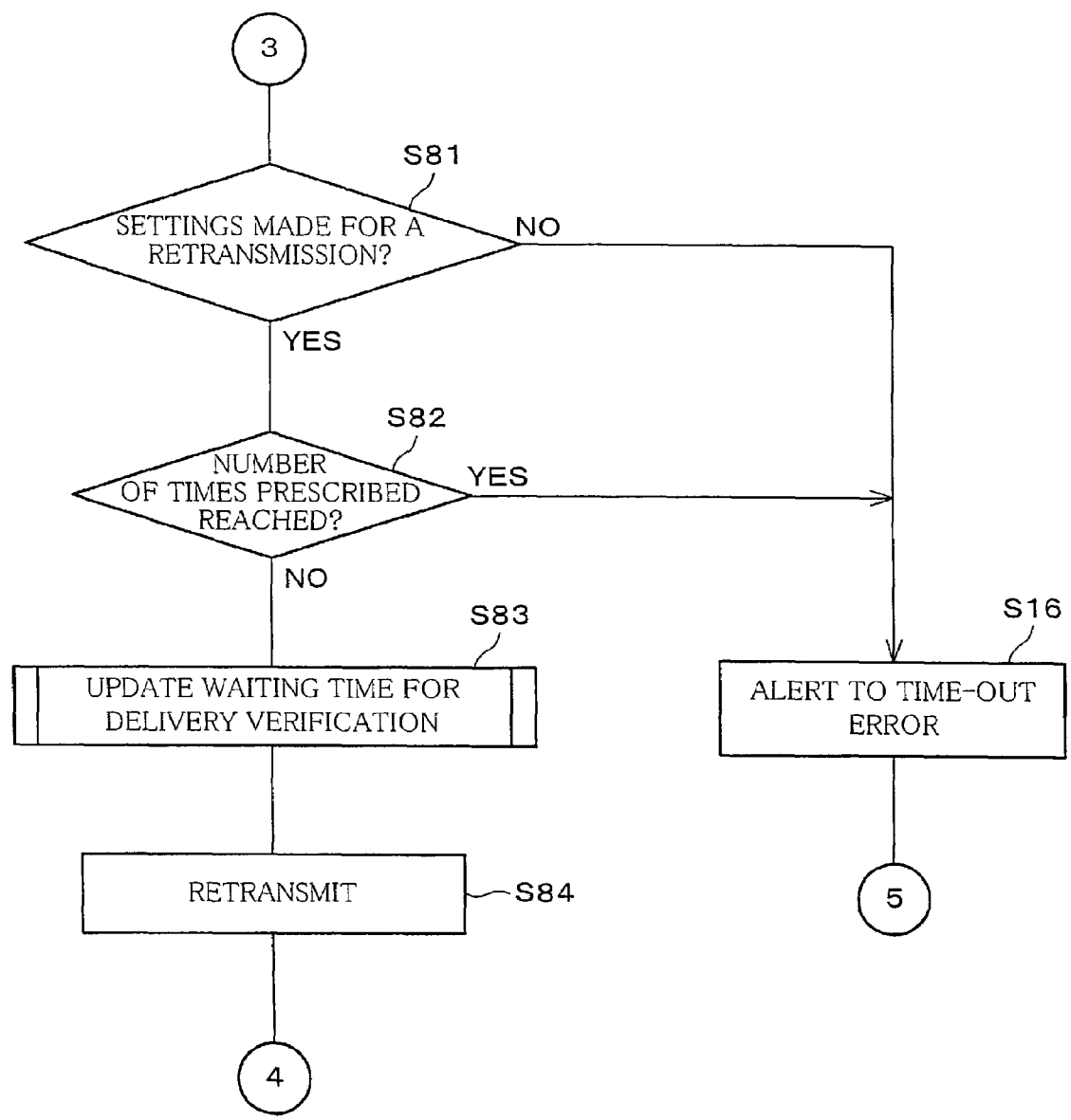
FIG. 13 is a flow chart showing an operation on transmission of a facsimile/e-mail machine (network communication device) of the fourth embodiment in accordance with the present invention.

FIG. 12 and FIG. 13 are flow charts illustrating an operation of the facsimile/e-mail machine 11 which is a network communication device of the fourth embodiment in accordance with the present invention during transmission. The operation in FIG. 12 and FIG. 13 is very similar to that in FIG. 3 above; equivalent parts are given identical reference symbols, and description thereof is omitted.

Attention should be paid to the fact that the transmission operation is similar from steps S1 to S15 and also that the termination the measuring of the waiting time for delivery verification from a timeout error in steps S14 and S15 is followed by the retransmission in steps S81 to S84. That is, step S81 determines whether settings have been made for a retransmission; if no such settings have been made, step S16 alerts the operator to the timeout error through the display unit 31 in the control console section 13, and the operation continues at step S13 which sets the waiting time to a value for a next transmission and terminates the process.

In contrast, if step S81 determines that settings have been made for a retransmission, the operation continues at step S82 which determines whether the number of times prescribed in the retransmission is exceeded. If the prescribed number of times is exceeded, the operation continues at step S16 and proceeds to step S13. If the prescribed number of times is not exceeded, the operation continues at step S83 which specifies a waiting time for a next transmission similarly to step S13. Thereafter, step S84 either makes a request for a response (delivery verification response) or makes a request for a response and retransmit data (data including information on a request for a response), and the operation returns to step S2 which causes the machine to stand by for an incoming e-mail message verifying a safe delivery.

Thus, either a request for a response can be made or a request for a response can be made and data can be retransmitted, when a timeout error has occurred.

Figure 14:
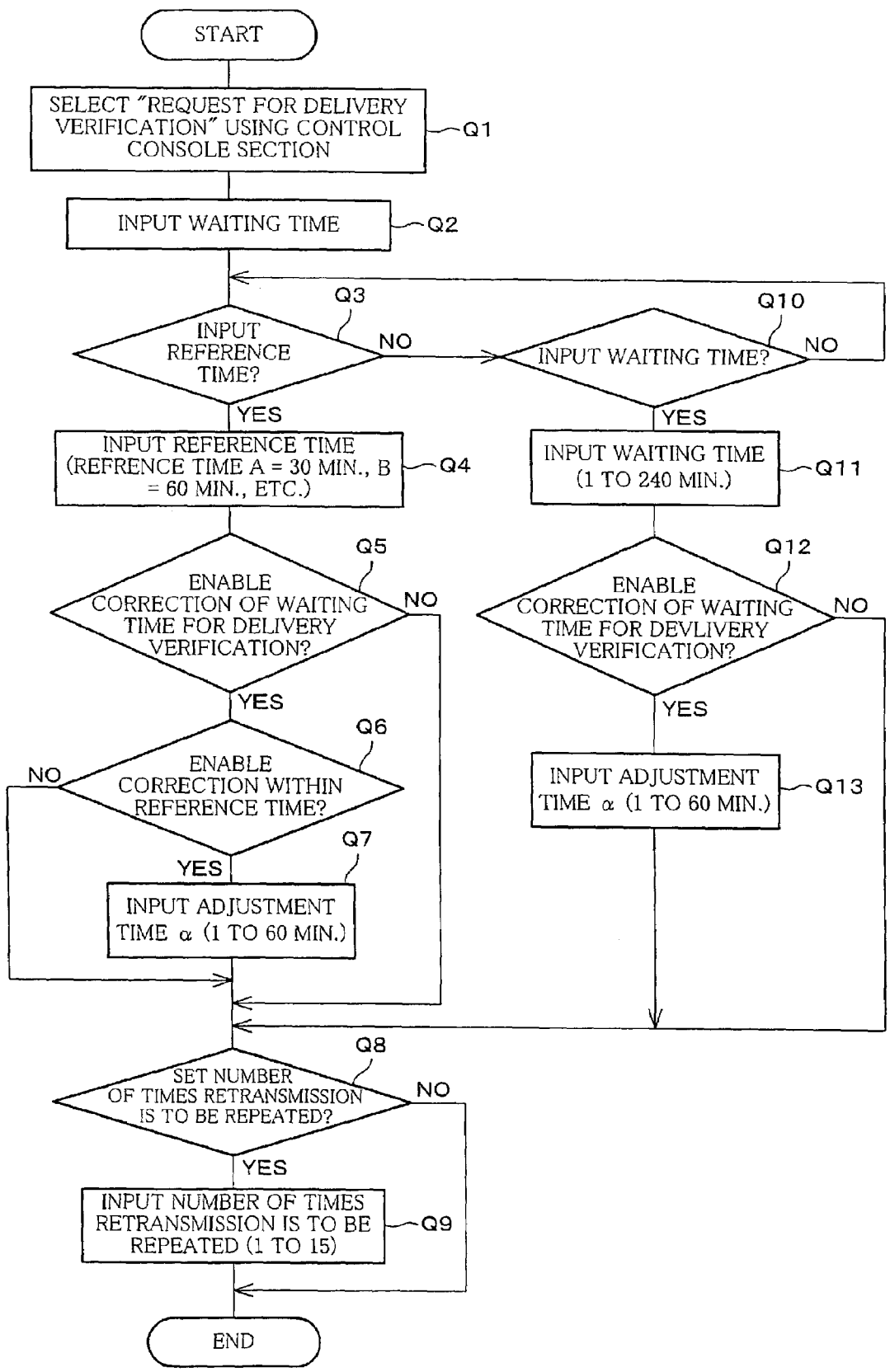
FIG. 14 is a flow chart showing a method of setting delivery verification conditions for a retransmission in the transmission operation in FIG. 12 and FIG. 13.

FIG. 14 is a flow chart illustrating a method of setting delivery verification conditions when a retransmission is performed as in the foregoing. The operation in FIG. 14 is to perform a retransmission as in the foregoing, and further includes setting, if any, the aforementioned reference time and adjustment time α. The flow chart illustrates in greater detail the aforementioned inputting of delivery verification conditions in step P10 in FIG. 7.

Step Q1 selects a "Request for Delivery Verification" using the control console section 13. Following step Q2 inputs a waiting time. Step Q3 determines whether a reference time is to be input. If so, the operation continues at step Q4 which inputs a reference time.

Step Q5 determines whether correction of the waiting time is to be enabled. If a correction is to be done, step Q6 further determines whether the correction is to be done within a reference time. If a correction is to be done, step Q7 inputs the adjustment time α, and the operation continues at step Q8. If steps Q5, Q6 determine that no correction is to be done, the operation proceeds directly to step Q8.

Step Q8 determines whether the number of times the retransmission is to be repeated is set, that is, whether a retransmission is to be done, and if so, whether the number of times the retransmission is to be repeated is set. If so set, step Q9 sets the number of times the retransmission is to be repeated and terminates the operation. If not, the operation directly terminates.

Meanwhile, if step Q3 determines that no reference time is to be input, the operation continues at step Q10 which determines whether a waiting time is to be direct input; if not, the operation returns to step Q3 which causes the machine to stand by for a waiting time input; if a waiting time is to be input, the operation continues at step Q11 which inputs one. Subsequently, step Q12 determines whether correction of the waiting time is to be enabled. If a correction is to be done, step Q13 further inputs the adjustment time α, and the operation continues at steps Q8, Q9 which sets the number of times the retransmission is to be repeated.

FIG. 15 shows an example of recipient information, stored in the control memory 14, on transmission destinations including thus specified delivery verification requests. When a reference time is selected for range-by-range switching, the waiting time for a delivery verification request is not directly set. When the waiting time is directly set, no reference time is set.

Names and e-mail addresses of, and short numbers assigned individually to, recipients are first entered into the recipient information. Further, the file format of the document, such as TIFF or PDF, which is suitable to the recipient facsimile/e-mail machine, the compression scheme, such as MH or MMR, whether a request needs to be made for a delivery verification (whether there are delivery verification settings), the timeout reference time (delivery verification reference time), the timeout (delivery verification waiting time), the adjustment time α, and the number of times the retransmission is to be repeated (the number of retransmissions when a delivery error is received) can be entered.

Here, assume that the timeout can be set between 1 to 240 minutes, and the number of retransmissions can be set to between 0 to 15. Transmission information, such as the addresses and numbers of the transmission destinations, whether there are delivery verification settings, and the number of times the retransmission is to be repeated, are not limited to those predetermined as recipient information, and may be directly input for each data transmission.

A retransmission is done this way, in which case the likelihood of a timeout error is reduced by step S83 which extends the waiting time.

Figure 16:
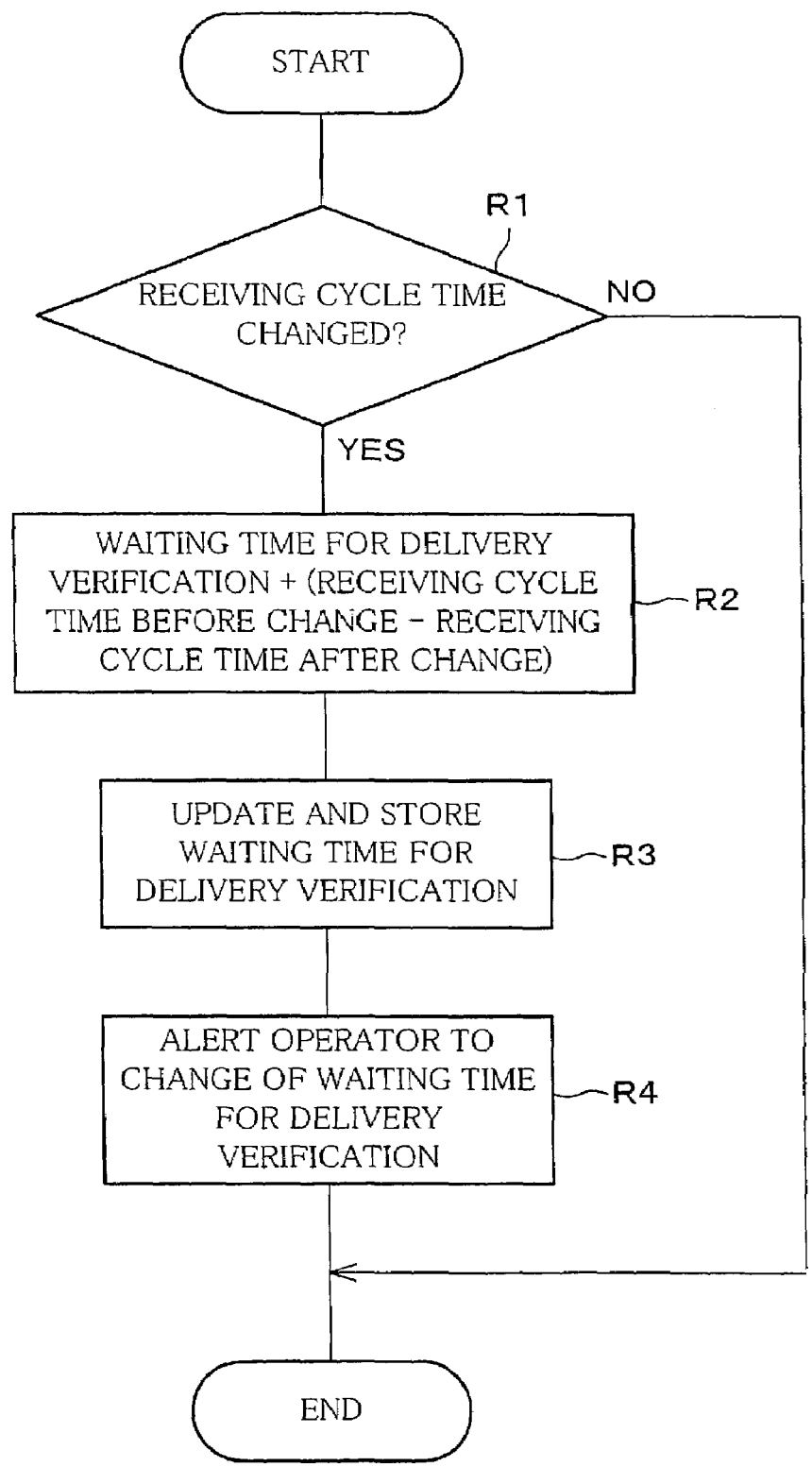
FIG. 16 is a flow chart showing an operation of a facsimile/e-mail machine (network communication device) of a fifth embodiment in accordance with the present invention where the waiting time is set for a next transmission.

The following will describe the fifth embodiment in accordance with the present invention in reference to FIG. 16.

FIG. 16 is a flow chart illustrating an operation of setting a waiting time for a next transmission as performed by a facsimile/e-mail machine which is a network communication device of the fifth embodiment in accordance with the present invention. Assuming an arrangement where communication is done via a network server, the operation is implemented when the connect time to the network server is changed. Such a situation occurs when, for example, the facsimile/e-mail machine 11 has been accessing the network server every 5 minutes in a normal state, but now changed to access it, for example, every 60 minutes because the operator leaves the facsimile/e-mail machine 11 for an extended period of time.

Step R1 determines whether such a receiving cycle has been changed and if not, directly terminates the operation. If step R1 determines that the receiving cycle has been changed, the operation continues at step R2 which changes the waiting time. For example, the difference between the receiving cycle times before and after the change is added to the current waiting time. Subsequently, step R3 updates the setting to that waiting time. Step R4 alerts the operator to the change and terminates the operation.

The arrangement enables a more suitable waiting time setting. The likelihood of a timeout error can be reduced, especially, when the receiving cycle time is extended.

The aforementioned embodiment explained communications based on MDN. Substantially the same effects are available with a transmission based on DSN (Delivery Status Notification; RFC1891/1894) whereby the mail server to which the receiving-end terminal is connected notifies the transmission destination of an e-mail message status.

As in the foregoing, the facsimile/e-mail machine (network communication device) 11 in accordance with the present invention is arranged to include:
   a delivery verification transmission/reception control section (response verification means) 25 for, over a network, making a request to a transmission destination to return a response and verifying that the response has been made within a predetermined waiting time;
   a clock section (measuring means) 26 for measuring a response time from the making of the request to reception of the response; and
   a time managing section (changing means) 27 for changing the waiting time in accordance with a result of the measurement by the measuring means.

Alternatively, the facsimile/e-mail machine (network communication device) 11 in accordance with the present invention may be a network communication device including a delivery verification transmission/reception control section (response verification means; response verification function) 25 for, upon data transmission over a network, making a request for a response from a transmission destination and verifying that the response has been made within a predetermined waiting time, and arranged to include: a clock section (measuring means) 26 for measuring a response time from the making of the request to the reception of the response; and a time managing section (changing means) 27 for changing the waiting time in accordance with a result of the measurement by the clock section 26.

According to the arrangement, in a network communication device having a response verification function for, upon data transmission over a network, such as data transfer from a host to a printer, making a request for a response from a transmission destination and checking whether the response has been made within a predetermined waiting time so as to alert the operator to a blocking or jamming on power supply to the transmission destination, the changing means corrects the waiting time on the basis of the response time actually measured by the measuring means, for example, to a mean or maximum value of measured values.

A suitable waiting time can be thus specified.

Another network communication device in accordance with the present invention is a network communication device having a delivery verification response function of, after completion of data transmission over a network, receiving a delivery verification response from a transmission destination within a predetermined waiting time to verify that data has been delivered to the transmission destination, and is arranged to include: measuring means for measuring a response time from the making of a request for the delivery verification response to the reception of the delivery verification response as a reply to the request; and changing means for changing the waiting time in accordance with a result of the measurement by the measuring means.

According to the arrangement, in a network communication device having a delivery verification response function which, upon the data transmission over a network, like mail transmission over the Internet, attaches, to the transmitted data, transmission information indicating that a response be made when the data is delivered, verifies that the response has been made within a predetermined waiting time, and alerts the operator to a delivery verification result, the changing means corrects the waiting time on the basis of the response time actually measured by the measuring means, for example, to a mean or maximum value of measured values.

A suitable waiting time can be thus specified.

Another network communication device in accordance with the present invention is a network communication device having a function as a network facsimile machine for data transmission/receive over a network and a function whereby a delivery verification response is made by, for example, MDN or DSN after facsimile data is transmitted in the form of an attachment file to an e-mail message, and arranged to include: measuring means for measuring a response time from the making of a request for the delivery verification response to the reception of the delivery verification response as a reply to the request; and changing means or changing the waiting time in accordance with a result of the measurement by the measuring means.

According to the arrangement, in alerting the operator to the success/failure of data delivery with a network communication device used as the so-called "Internet facsimile" using a delivery verification response function by, for example, MDN or DSN, the changing means corrects the waiting time up to the reception of the delivery verification result in accordance with a response time actually measured by the measuring means to, for example, a mean or maximum value of measured values.

A suitable waiting time can be thus specified.

Another network communication device in accordance with the present invention is preferably arranged so that the changing means further adds an adjustment time to the changed value.

Specifically, a network communication device in accordance with the present invention is preferably arranged so that the changing means designates a time obtained by further adding an adjustment time to the response time as the waiting time.

According to the arrangement, the further addition of an adjustment time to the value corrected in accordance with a measurement result provides a suitable margin to the waiting time.

Another network communication device in accordance with the present invention is preferably arranged so that the changing means, if the response time has been previously measured more than once, designates a mean response time of measured response times, exclusive of a maximum value and a minimum value thereof, as the waiting time.

Another network communication device in accordance with the present invention is preferably arranged so that the changing means designates a time obtained by adding an adjustment time further to the mean response time as the waiting time.

Another network communication device in accordance with the present invention is preferably arranged so that the changing means, if the waiting time has elapsed without receiving a response, extends a waiting time for a next transmission.

According to the arrangement, if the specified waiting time has elapsed without receiving a response, the changing means extends the waiting time for a next transmission. This reduces the likelihood of the occurrence of a timeout error.

Another network communication device in accordance with the present invention is preferably arranged to further include retransmission means for, if the waiting time has elapsed without receiving a response, performing retransmission and so that the changing means extends the waiting time upon the retransmit by the retransmission means.

According to the arrangement, if a timeout error has occurred where the specified waiting time has elapsed without receiving a response, the retransmission means performs retransmission, and the changing means extends the waiting time. This reduces the likelihood of the occurrence of a timeout error.

Another network communication device in accordance with the present invention is preferably arranged so that the changing means, if a last waiting time is longer than a current waiting time, changes the waiting time to the last waiting time.

According to the arrangement, if a timeout error has occurred where the specified waiting time has elapsed without receiving a response, the retransmission means performs retransmission, and if the last waiting time is longer than the current waiting time, the changing means sets the waiting time to the last value to extend the waiting time.

The last value is already tried and tested, further reducing the likelihood of the occurrence of a timeout error.

Another network communication device in accordance with the present invention is preferably arranged so that the changing means, upon the retransmission by the retransmission means, further adds an adjustment time to the changed value.

According to the arrangement, if a timeout error has occurred where the specified waiting time has elapsed without receiving a response, the retransmission means performs retransmission, and the changing means extends the waiting time and also adds an adjustment time to provide a suitable margin to the waiting time. This further reduces the likelihood of the occurrence of a timeout error.

Another network communication device in accordance with the present invention is preferably arranged so that the changing means, upon the retransmission by the retransmission means, changes the waiting time to a longest one of previously specified waiting times.

According to the arrangement, the likelihood of the occurrence of a timeout error is further reduced.

Another network communication device in accordance with the present invention is preferably arranged so that: waiting times specified by the changing means are divided into multiple ranges; and the specified waiting time is a maximum value in each division.

According to the arrangement, the waiting time is not varied continuously, but range by range, and set to a maximum value in each division. Thus, even if the actual response time varies for each transmission due to communication status, since the specified waiting time has a sufficiently large width, a margin is provided which prohibits small variations in the waiting time caused by minor changes in communication status and thus makes the waiting time stable.

Another network communication device in accordance with the present invention is preferably arranged so that the changing means, if the specified waiting time has elapsed without receiving a response, changes a waiting time for a next transmission to a longer range than a current waiting time range.

According to the arrangement, if the specified waiting time has elapsed without receiving a response, the changing means changes a waiting time for a next transmission to a longer range than the current range. This reduces the likelihood of the occurrence of a timeout error.

Another network communication device in accordance with the present invention is preferably arranged so that the changing means, if the specified waiting time has elapsed without receiving a response, deletes previously measure times.

According to the arrangement, in the case of a timeout error occurrence, chances are that communications environment have greatly changed. The deletion of previously measured values enables a new suitable waiting time to be specified without being affected by the mean and maximum values and other previous data.

Another network communication device in accordance with the present invention is preferably arranged so that the changing means, in an arrangement where communication is performed via a network server, if a connect time to the network server is changed, also changes a setting of the waiting time.

According to the arrangement, if a setting for the time required to connect to the network server has been changed in an arrangement having a network server connection function due to the replacement of a communication medium or a change in access interval, the waiting time is also changed. This enables the waiting time to be set to a suitable value. Especially, when the connect time extends, the likelihood of the occurrence of a timeout error is reduced.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A network communication device, comprising:
   response verification means for, over a network, making a request to a transmission destination being a receiving-end terminal to return a response and verifying that the response has been made within a predetermined waiting time;
   measuring means for measuring a response time from the making of the request to reception of the response, the response time being set in an MDN function to verify the response from the receiving-end terminal, and an email transmitted to the receiving-end terminal is determined as being undelivered if no response from the receiving-end terminal is verified within the response time; and
   changing means for changing the waiting time in accordance with a result of the measurement by the measuring means,
   wherein the changing means, if the response time has been previously measured more than once, designates as the waiting time a mean response time of measured response times, exclusive of a maximum value and a minimum value thereof, with an adjustment time added to the mean response time.

2. The network communication device as set forth in claim 1, wherein the response is a delivery verification response, received after completion of transmission of data to the transmission destination, which indicates whether the data has been delivered.

3. The network communication device as set forth in claim 1, wherein:
   the device further has a function as a network facsimile machine for data transmission/reception over a network; and
   the response is a delivery verification response which, after transmitting data as an attachment file to an e-mail message, indicates whether the data has been delivered.

4. The network communication device as set forth in claim 1, wherein the response verification means, in transmitting data over a network, makes a request to the transmission destination to return a response and verify that the response has been made within a predetermined waiting time.

5. The network communication device as set forth in claim 1, wherein the changing means designates a time obtained by adding an adjustment time further to the response time as the waiting time.

6. The network communication device as set forth in claim 1, wherein the changing means, if the waiting time has elapsed without receiving a response, extends a waiting time for a next transmission.

7. The network communication device as set forth in claim 1, the device further comprising retransmission means for, if the waiting time has elapsed without receiving a response, retransmitting either a response request for a return response from the transmission destination or the response request and the data, wherein the changing means extends the waiting time upon the retransmission by the retransmission means.

8. The network communication device as set forth in claim 7, wherein the changing means, if a last waiting time is longer than a current waiting time, changes the waiting time to the last waiting time.

9. The network communication device as set forth in claim 7, wherein the changing means, upon the retransmission by the retransmission means, designates a time obtained by adding an adjustment time further to the response time as the waiting time.

10. The network communication device as set forth in claim 7, wherein the changing means, upon the retransmission by the retransmission means, changes the waiting time to a longest one of previously specified waiting times.

11. The network communication device as set forth in claim 1, wherein:
    waiting times specified by the changing means are divided into multiple ranges; and
    the specified waiting time is a maximum value in each division.

12. The network communication device as set forth in claim 11, wherein the changing means, if the waiting time has elapsed without receiving a response, changes a waiting time for a next transmission to a longer range than a current waiting time range.

13. The network communication device as set forth in claim 1, wherein the changing means, if a specified waiting time has elapsed without receiving a response, deletes previously measured times.

14. The network communication device as set forth in claim 1, wherein the changing means, in an arrangement where communication is performed via a network server, if a connect time to the network server is changed, also changes a setting of the waiting time.

15. The network communication device as set forth in claim 1, wherein:

the device further has a function as an e-mail message machine for e-mail transmission/reception over a network; and the response is a delivery verification response which, after transmitting an e-mail message, indicates whether the e-mail message has been delivered.

* * * * *